US006766145B2

(12) United States Patent
Fitzgerald et al.

(10) Patent No.: US 6,766,145 B2
(45) Date of Patent: Jul. 20, 2004

(54) PRENATAL-TO-INFANT MONITORING DEVICE

(75) Inventors: Karen Fitzgerald, Elma, NY (US); Domenic Thomas Gubitosi, East Aurora, NY (US); Mark H. Weppner, Williamsville, NY (US); Bryan M. Brown, East Amherst, NY (US)

(73) Assignee: Mattel, Inc., El Segundo, CA (US)

( * ) Notice: Subject to any disclaimer, the term of this patent is extended or adjusted under 35 U.S.C. 154(b) by 33 days.

(21) Appl. No.: 09/984,021

(22) Filed: Oct. 26, 2001

(65) Prior Publication Data

US 2003/0083540 A1 May 1, 2003

(51) Int. Cl.[7] ................................................ H04B 17/00

(52) U.S. Cl. ..................... 455/67.11; 340/539; 340/453

(58) Field of Search ................................ 600/453, 437, 600/28; 340/539, 573.1; 455/11.1, 67.11, 41.2

(56) References Cited

U.S. PATENT DOCUMENTS 2,536,527 A 1/1951 Appel
3,187,098 A 6/1965 Farrar et al.
3,247,324 A 4/1966 Cefaly et al.
3,348,535 A 10/1967 Gregg
3,621,844 A 11/1971 Hayashi et al.
3,703,168 A 11/1972 Frink
D237,893 S 12/1975 Wennerstrom
4,101,872 A 7/1978 Pappas
4,148,313 A 4/1979 Bird et al.
4,220,160 A 9/1980 Kimball et al.
4,413,629 A * 11/1983 Durley ....................... 128/660
4,878,501 A 11/1989 Shue
4,898,179 A 2/1990 Sirota
4,899,135 A 2/1990 Ghahariiran
D312,222 S 11/1990 Sawyer
4,978,946 A 12/1990 Nordholm et al.
5,010,890 A 4/1991 Pfohl et al.
D339,540 S 9/1993 Chapelsky
5,307,051 A 4/1994 Sedlmayr
5,319,355 A 6/1994 Russek
5,446,934 A 9/1995 Frazier
5,533,959 A 7/1996 Newman et al.
5,549,113 A 8/1996 Halleck et al.
5,589,818 A 12/1996 Queen
5,684,460 A 11/1997 Scanlon
5,689,802 A * 11/1997 Luzzatto .................... 455/11.1
5,766,208 A 6/1998 McEwan
5,853,005 A 12/1998 Scanlon
D405,020 S 2/1999 Brown et al.
D407,159 S 3/1999 Roberg
5,907,291 A 5/1999 Chen et al.
5,914,660 A 6/1999 Mesibov et al.
6,011,477 A 1/2000 Teodorescu et al.
6,043,747 A 3/2000 Altenhofen
6,057,758 A 5/2000 Dempsey et al.
6,091,329 A 7/2000 Newman
6,116,983 A 9/2000 Long et al.
6,470,076 B1 * 10/2002 Iwami ....................... 379/67.1

FOREIGN PATENT DOCUMENTS

GB 2 322 952 A 9/1998
JP 06296593 A 10/1994
WO wo98/42110 * 9/1998 ............ H04M/1/00

OTHER PUBLICATIONS

Instructional Pamphlet for "Teach your unborn baby!™", Bébé Sounds™, Prenatal Teacher™, pp. 1–20, Listro Associates, 1999, Unisar Inc., NY.
Instructional Pamphlet for "Bond with your unborn baby!™", Bébé Sounds™, Prenatal Talker, pp. 1–8, Listro Associates, 1999, Unisar Inc., NY.
Instructional Pamphlet for "Escuchador del Corazòn Prenatal", Bébé Sounds™, Prenatal Heart Listener™, pp. 1–26, Listro Associates, 2000, Unisar Inc., NY.

* cited by examiner

*Primary Examiner*—Lee Nguyen
(74) *Attorney, Agent, or Firm*—Cooley Godward LLP

(57) ABSTRACT

A child monitor system that combines the functionality of a prenatal monitor and a conventional nursery room monitor in a single device. The device comprising a local unit and a remote unit. Each unit having the capability of receiving and outputting acoustic audio signals as well as the capability of transmitting and receiving these signals to and from the units. The device also comprises a selection device for allowing a user to select from a plurality of operating modes.

10 Claims, 29 Drawing Sheets

210

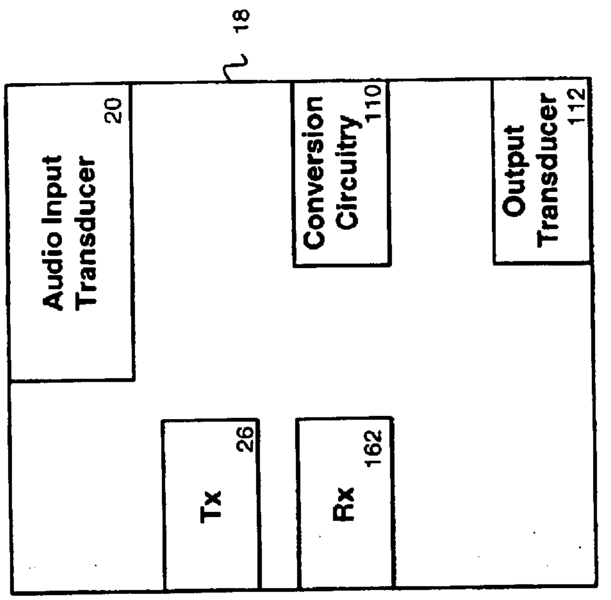
FIG. 27
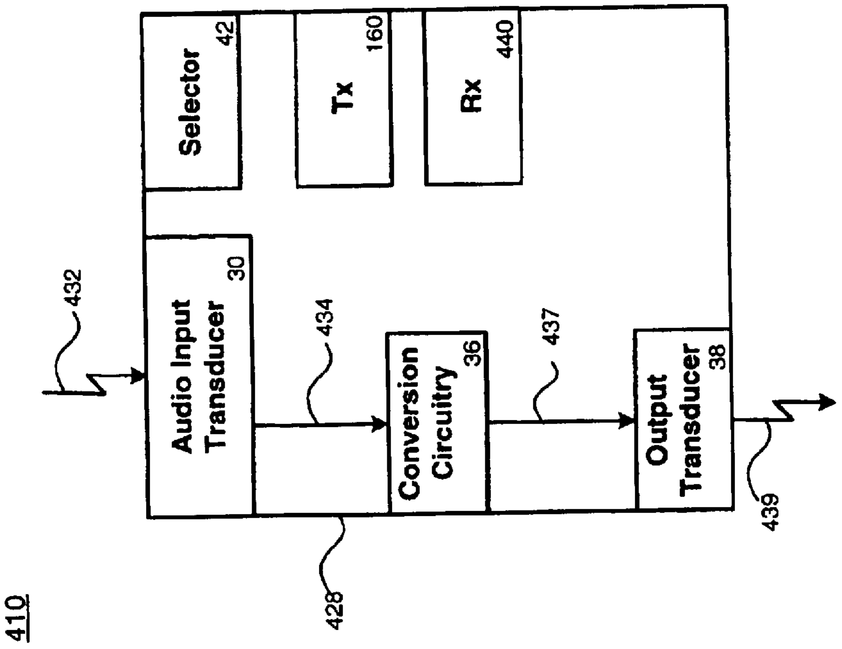

PRENATAL-TO-INFANT MONITORING DEVICE

BACKGROUND

1. Field of the Invention

The present invention relates to prenatal monitors and nursery room monitors and, more particularly, to a single device encompassing both.

2. Discussion of the Related Art

During the time period when expectant parents await their baby, much anticipation and excitement exists at the prospect of having a newborn. A large part of this excitement is the realization that the baby is living and growing inside the mother's womb. Consequently, expectant parents desire to hear evidence of their baby's existence, most notably the baby's beating heart and other movements. This greatly enhances the experience for the parents and allows them to feel closer to their child even before the mother gives birth. As a result, expectant parents may purchase devices that allow them to hear their unborn baby's heartbeat. These prenatal monitors, as they are called, also typically allow expectant parents to hear other sounds generated by the unborn child including kicks and hiccups. Some of these devices also allow expectant parents to record these sounds, play music or educational recordings to the child, and allow the parents to send the sound of the parents' voices to the child. This is typically done using equipment external from the monitor itself. These devices, however, have a drawback in that their functional life is limited. Specifically, parents no longer have a need for these prenatal monitors when the mother gives birth. Thus, the parents set them aside after typically using them for only three months or less and possibly never use them again.

After the birth of their child, parents often, however, need a room monitor. These devices allow parents to monitor the activities of their child from a remote location, usually from another room within the same home or from an area just outside of the home. The monitors, sometimes called baby monitors, infant monitors, or child monitors, usually have a transmitter and a receiver. The monitors transmit signals representing the activities within the monitored room to a receiver located in another room. Usually the monitors transmit activities of an audible nature such as a child's crying, breathing, or any other activities that generate audible signals. These devices, however, also have a drawback in that they are limited to this functionality. More particularly, parents cannot, for example, use them to monitor the heartbeat of an unborn child.

Thus, it would be advantageous to have a device that incorporates the functions of a prenatal monitor and a room monitor into a single device thus extending the life of prenatal monitors and expanding the functionality of room monitors. Such a device will provide economic efficiency in that a consumer may purchase one product instead of two and use the product for an extended period of time.

SUMMARY OF THE INVENTION

The disclosed child monitor overcomes the shortcomings of the prior art in that it allows a user to operate the system either as a nursery room monitor or as a prenatal monitor. The child monitor has two units, and the user may choose to use the system as a prenatal monitor, using one of the units, or as a conventional nursery room monitor using both the parent unit and the child unit.

BRIEF DESCRIPTION OF THE DRAWINGS

FIG. 27 illustrates a third operating mode of the child monitor system of FIG. 24.

DETAILED DESCRIPTION

The present invention discloses a single device that may be used as either a prenatal monitor or a nursery monitor. The exemplary embodiments of the child monitor disclosed below include two units-a local unit and a remote unit. The user may use the device in one of two ways. First, the user can use the device to monitor a child located in another room of a home, for example. Alternatively, the user can use the device to listen to sounds made by a fetus in the mother's womb. To monitor a child located in another room, the user places the remote unit in the child's room and keeps the local unit in the user's location. The sounds will be transmitted from the remote unit to the local unit thus allowing the user to audibly monitor the child. To listen to prenatal sounds, the user places the remote unit next to the mother's abdomen. The remote unit receives and outputs sounds made by the fetus. While these are the most common functions, variations on the operation and functionality of the device are possible and are described in detail below.

Figure 1:
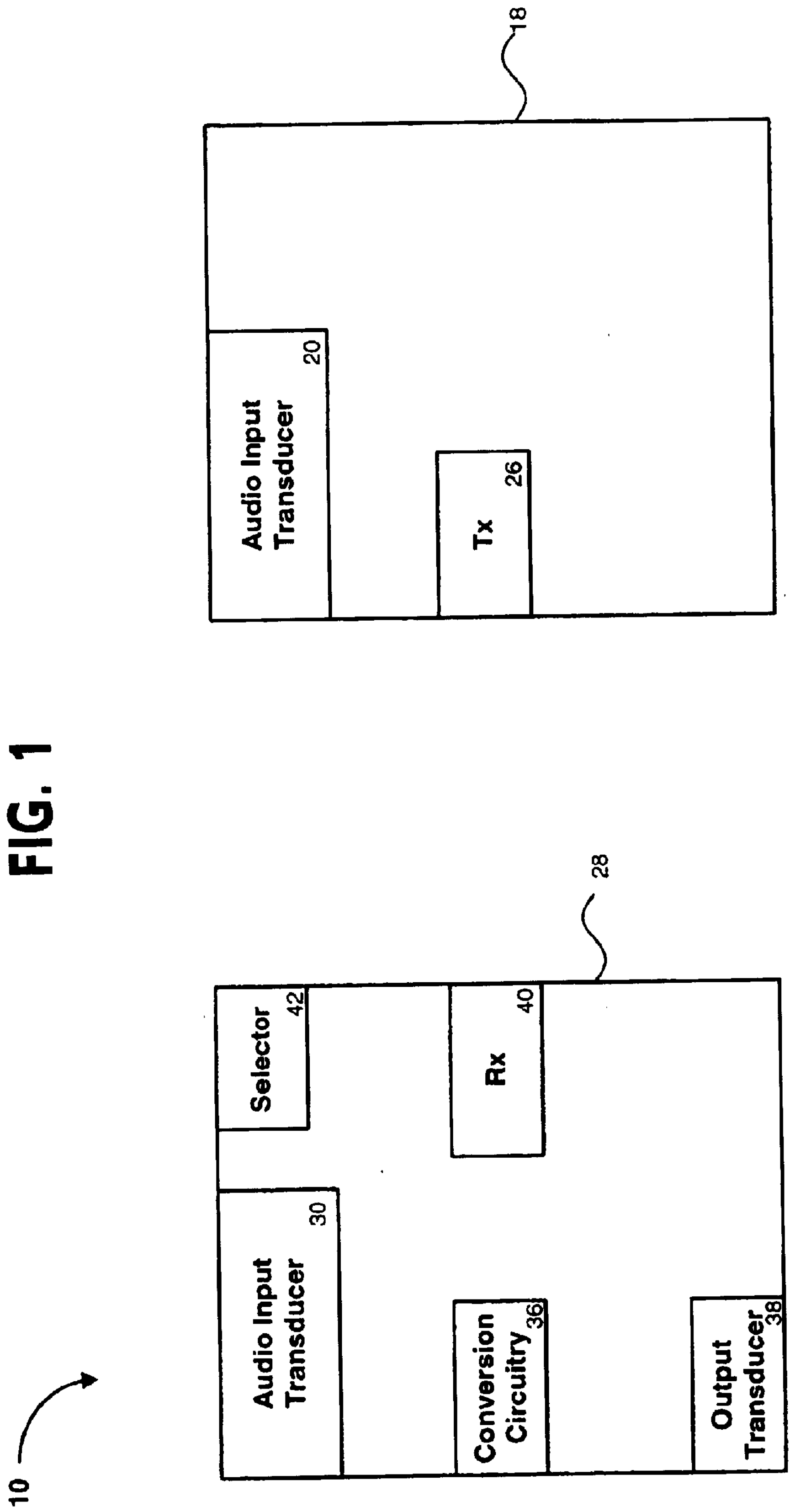
FIG. 1 is a schematic view of a first embodiment of a child monitor system.

A first embodiment of a child monitor system 10 is illustrated schematically in FIG. 1. In this embodiment, the system may receive audio inputs from two sources and deliver a single audio output. The child monitor system 10 includes a remote unit 18, having a first input transducer 20 and a transmitter 26, and a local unit 28, having a second audio input transducer 30, conversion circuitry 36, an output transducer 38, a receiver 40, and a selector 42.

The first audio input transducer 20 of the remote unit 18 converts an incident acoustic input into a first input signal. Acoustic input can include speech, crying, breathing, etc., from an infant or child. Likewise, the second audio input transducer 30 of the local unit 28 converts an incident acoustic input into a second input signal. This second input signal includes fetal heartbeat and other womb sounds, and these sound can be isolated or enhanced by filtering out other sounds.

The conversion circuitry 36 converts the input signals into an output signal, which the output transducer 38 of the local unit 28 further converts into an acoustic output. From this configuration, the selector 42 allows a user to choose whether the system 10 will output the audio input from the local unit 28 or the audio input from the remote unit 18. The second input signal can be communicated from the remote unit 18 to the local unit 28 via transmitter 26 and receiver 40.

Figure 2:
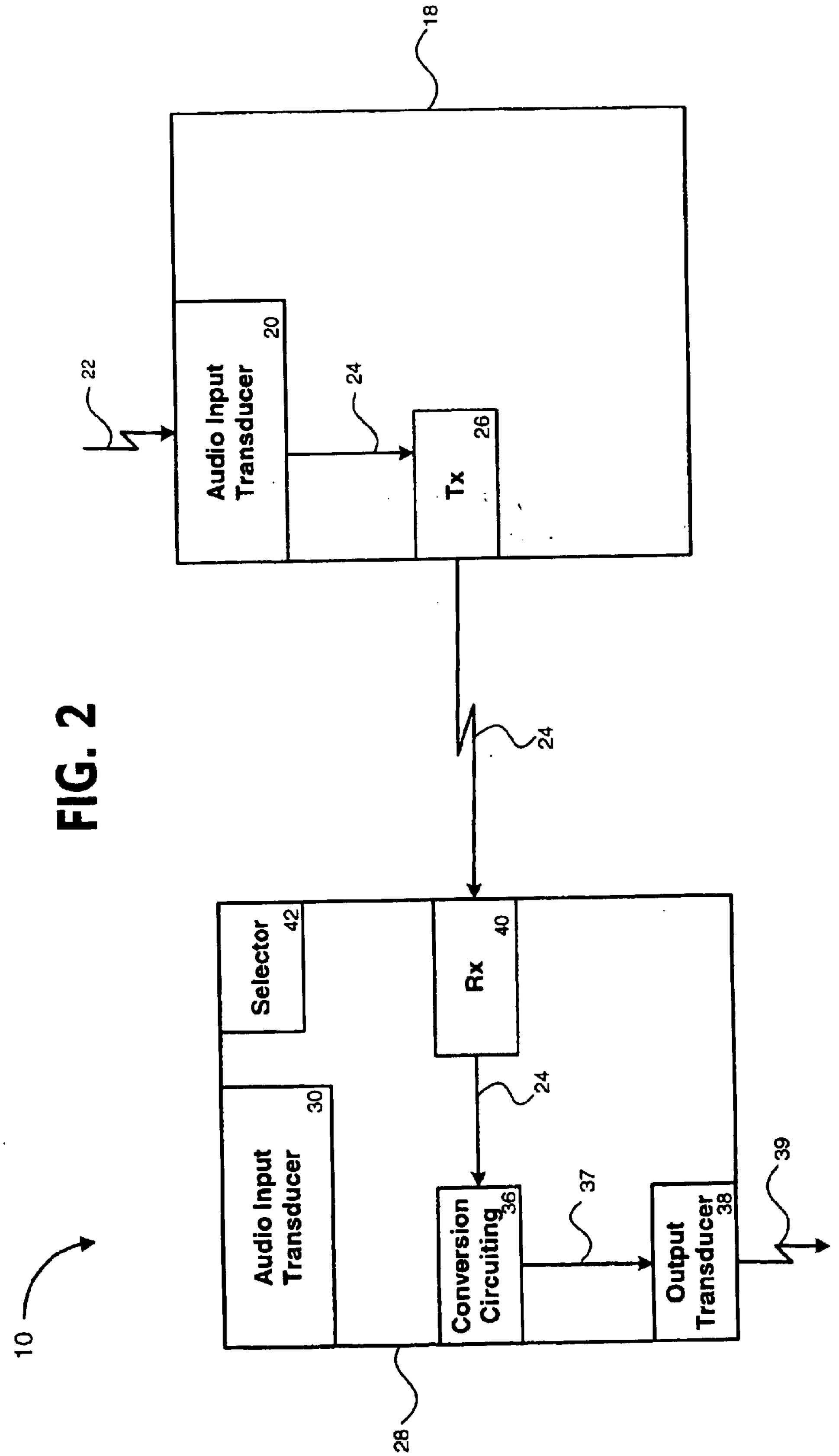
FIG. 2 illustrates a first operating mode of the child monitor system of FIG. 1.

FIG. 2 illustrates a first operating mode of the system of FIG. 1. The user has, via the selector 42, chosen that the system 10 output the audio input 22 from the remote unit 18. The audio input transducer 20 of the remote unit 18 receives a first acoustic input 22 and converts it to a first input signal 24. The transmitter 26 of the remote unit 18 transmits this signal to the receiver 40 of the local unit 28, which passes it on to the conversion circuitry 36. The conversion circuitry 36 converts first input signal 24 into an output signal 37, which the output transducer 38 then converts into an audio output 39.

Figure 3:
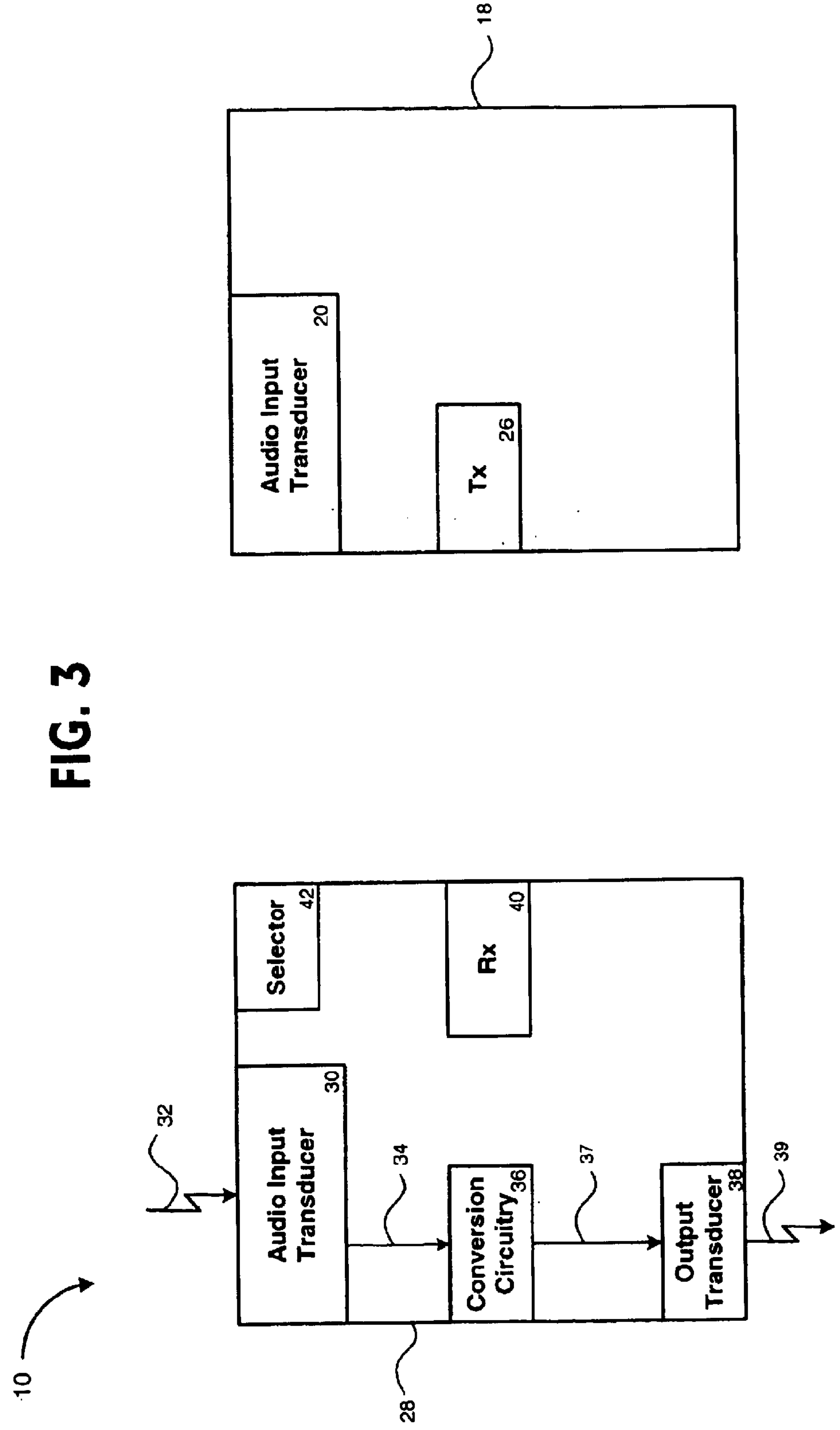
FIG. 3 illustrates a second operating mode of the child monitor system of FIG. 1.

FIG. 3, in contrast, illustrates a second operating mode for the configuration shown in FIG. 1. The user has chosen that the system 10 output the audio input 32 from the local unit 28. In this mode, the second audio input transducer 30 of the local unit 28 receives a second acoustic input 32 and converts it to a second input signal 34. The conversion circuitry 36 then converts this signal into an output signal 37, which the output transducer 38 then converts into an audio output 39.

These operating modes allow the user the option of using the child monitor as a nursery room monitor or a prenatal monitor. The flowcharts of FIGS. 4 and 5 illustrate the operation of the system in these modes.

Figure 4:
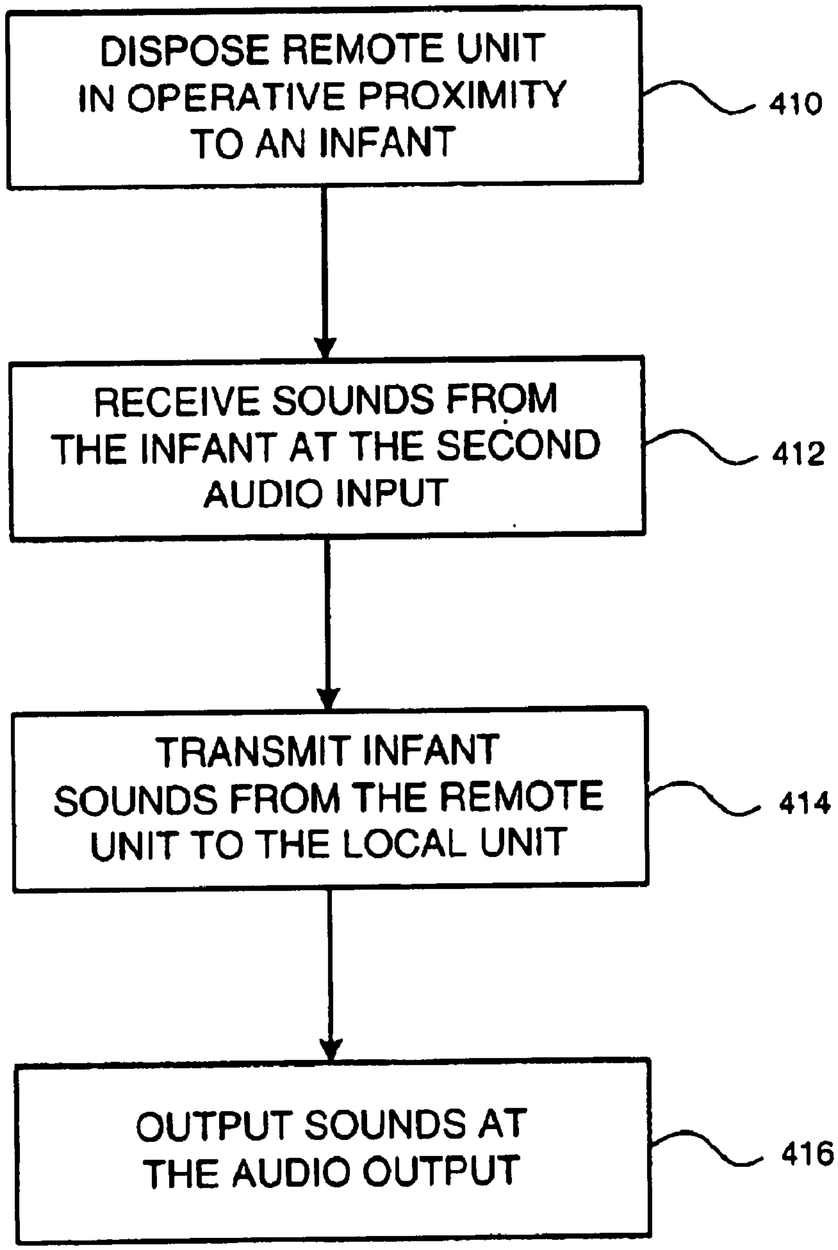
FIG. 4 is a flowchart illustrating a method for listening for sounds made by an infant near the remote unit of the child monitor system of FIG. 1.

FIG. 4 is a flowchart describing the operation of the system as a nursery room monitor, allowing a parent or user to listen to sounds made by an infant located near the child unit or monitor room sounds. As shown in operation 410, the user places the remote unit in operative proximity to an infant, and, as shown in operation 412, the audio input device of the remote unit receives the sounds of the infant's activities. The remote unit then transmits these signals to the receiver of the local unit as shown in operation 414. The local unit's output transducer then outputs these sounds as shown in operation 416.

Figure 5:
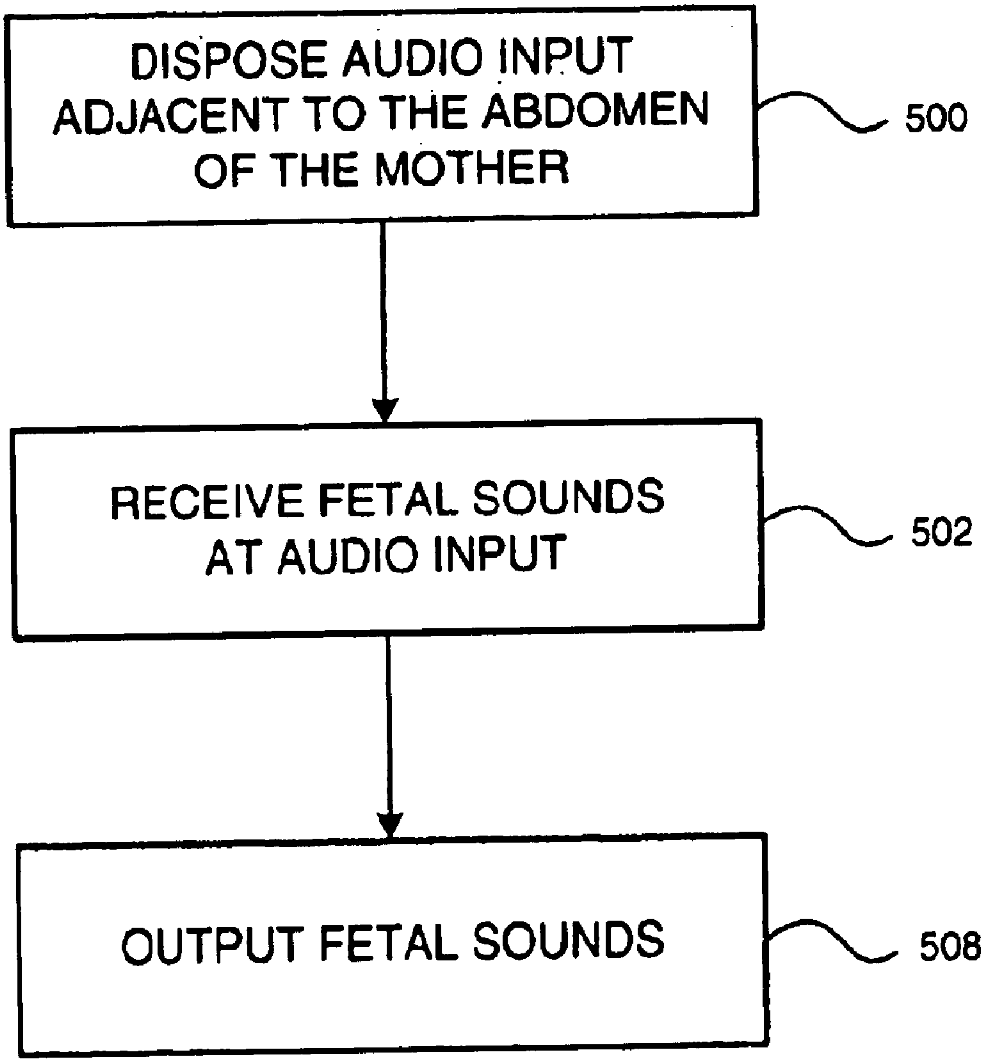
FIG. 5 is a flow chart illustrating a method for listening for fetal sounds of an unborn child using the local unit of the child monitor system of FIG. 1.
Figure 6:
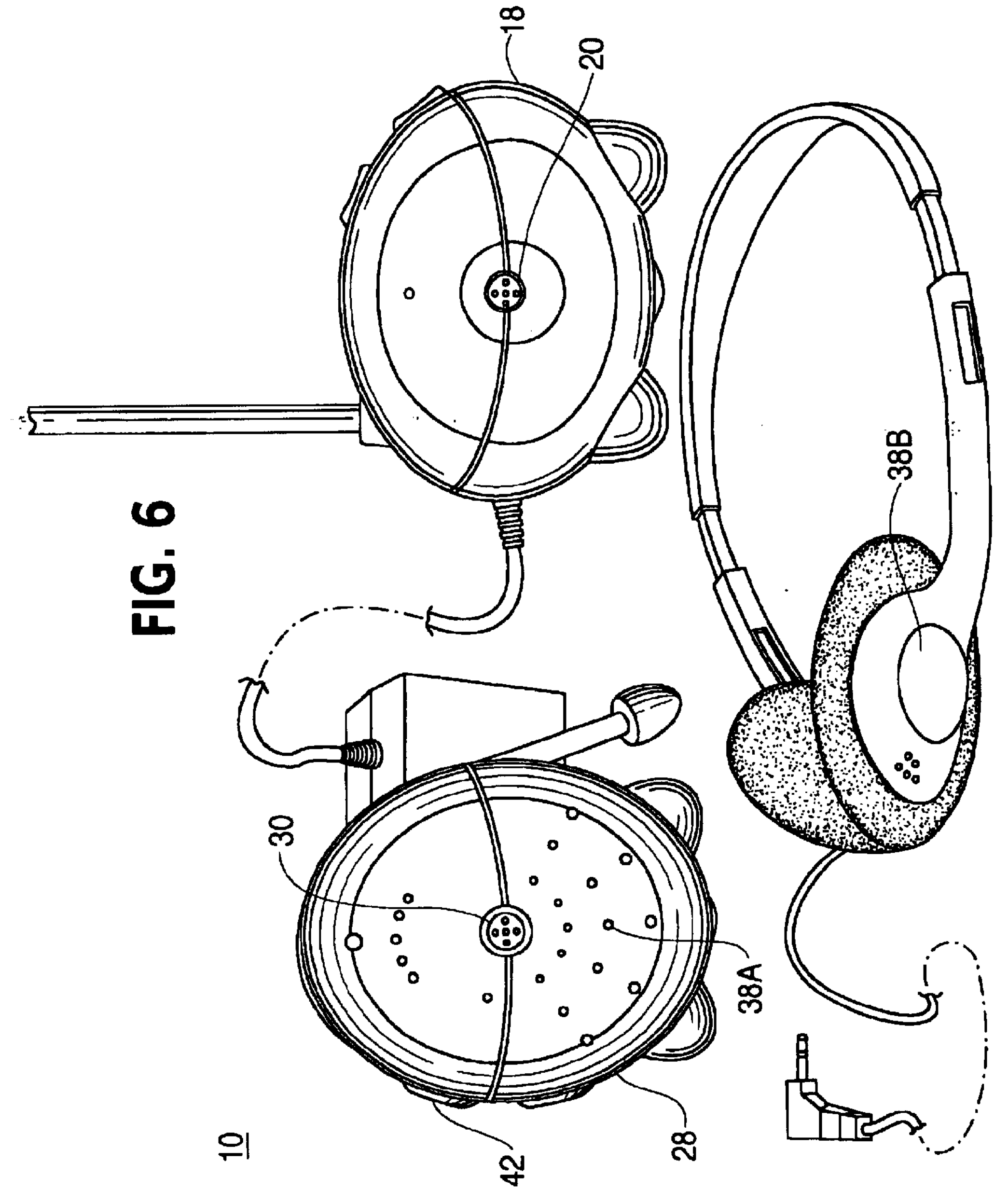
FIG. 6 is a perspective view of an example embodiment of the child monitor system of FIG. 1.

FIG. 5 is flowchart describing the operation of the system as a prenatal monitor for listing to sounds made by a fetus still in the mother's womb. The system does not require use of the remote unit in this mode. First, in operation 500, the user places the audio input of the local unit adjacent to the mother's abdomen. The audio input receives the fetal sounds as shown in operation 502. In so doing, the monitor uses RF high-pass and low-pass filters to focus on the fetal sounds. They filter out sounds below 30 Hz (which eliminates digestion sounds) and sounds above 1 KHz (eliminating ambient room noise). The fetal sounds are then amplified before being output by the audio output as shown in operation 508. In one embodiment, the user receives this audio output through headphones.

FIGS. 6–12 depict one implementation of child monitor system 10. In the following discussion, the same reference numbers are used to identify components that correspond to those illustrated schematically in FIGS. 1–5. The system 10 includes a local unit 28 and a remote unit 18.

Local unit 28 includes an audio input transducer 30, a selector 42, and an audio output transducer 38 (shown as 38A and 38B). Local unit 28 includes several visual displays and user controls. The displays include a POWER ON/LOW BATTERY LED 72 and a sound level indicator 74 implemented as a series of LEDs (preferably five, but more or fewer could be used). The user controls include an ON/OFF/VOLUME switch 70, an A/B channel select switch and mode selector 42.

Figure 7:
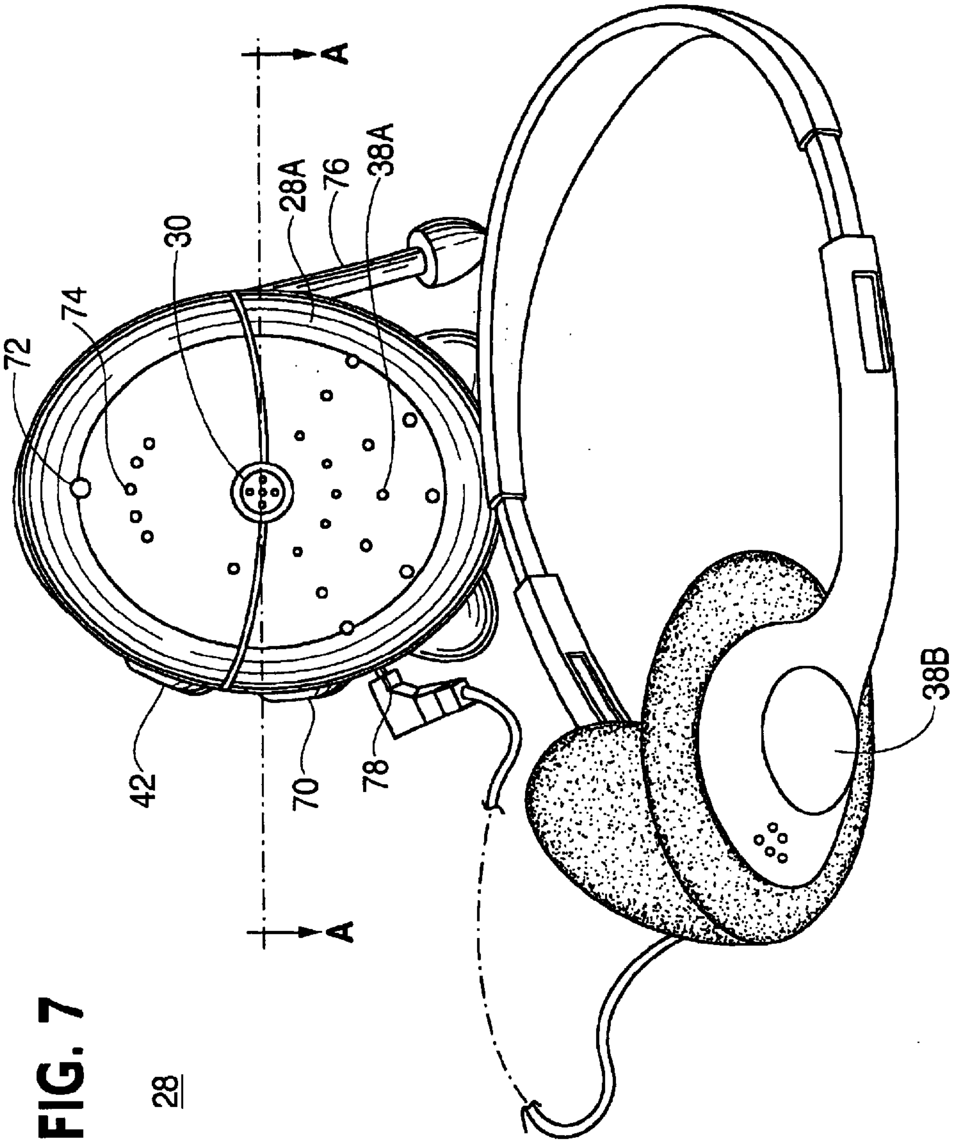
FIG. 7 is a frontal view of the local unit of the child monitor system of FIG. 1.
Figure 29:
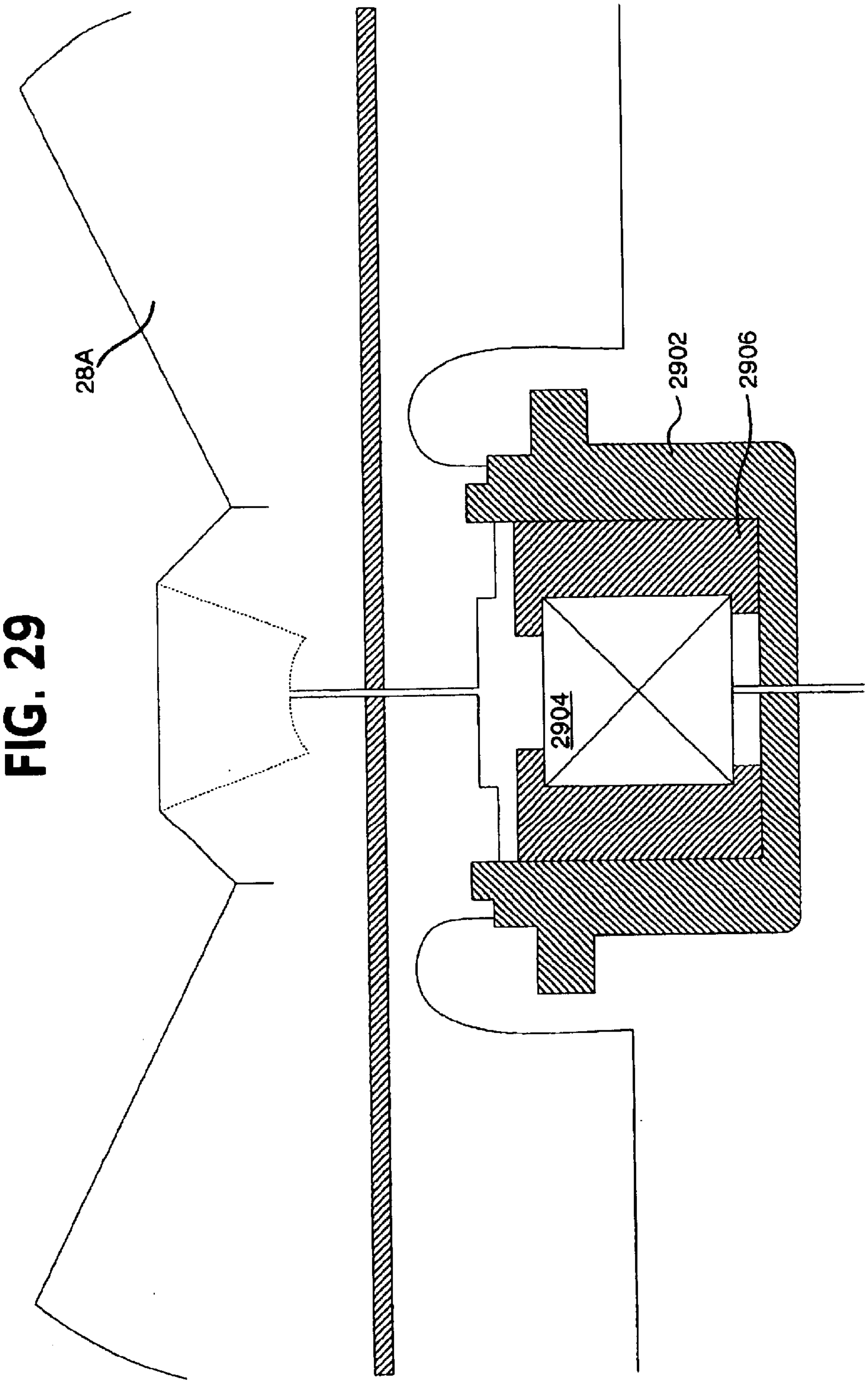
FIG. 29 is a cross sectional schematic representation of the microphone of the local unit of the child monitor system taken along line A—A of FIG. 7.

Audio input transducer 30 is implemented as a condenser microphone mounted on the front face of front housing 28A of local unit 28. The microphone is unidirectional and "floating," i.e. isolated from its housing. In one embodiment, shown in FIG. 29 (the cross sectional viewpoint is shown in FIG. 7), the microphone 2904 is isolated from housing 2902 by a rubber ring 2906. Rubber ring 2906 is soft without being fully compressible and has preferably a durometer reading of 20 to 30.

In this implementation, audio output transducer 38 includes two alternative transducers, 38A and 38B. Transducer 38A is a speaker (2"/5 cm) located behind the perforated front face of the housing of local unit 28. Transducer 38B is a pair of headphones (or multiple pairs of headphones) coupled to local unit 28 via a headphone jack 78. In an alternative implementation, a recording device could be connected via headphone jack 78 to enable the audio signals to be recorded by an external recording device.

Figure 12:
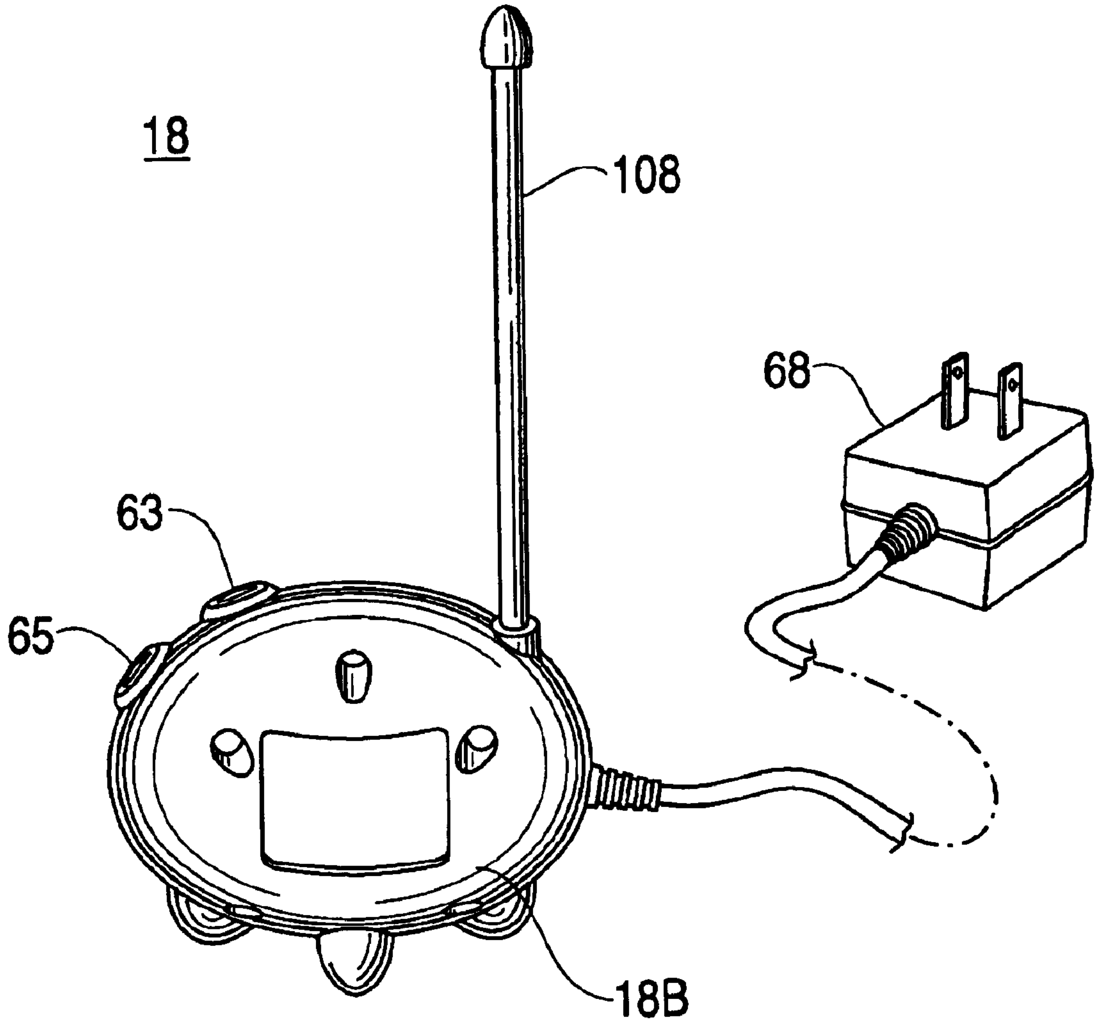
FIG. 12 is a rear view of the remote unit of the child monitor system of FIG. 1.

Local unit 28 also includes antenna 76 and antenna retainer 88 disposed on rear housing 28B. Flexible antenna 76 has a proximal end 82 coupled to the housing and a distal end 84 with a body 86 extending therebetween. A retainer 88 is coupled to the rear housing 28B and is able to maintain the antenna in an alternative position adjacent the rear housing 28B of the local unit 28. Flexible antenna 76 is reconfigurable between a first configuration where the body 86 is spaced away from rear housing 28B and a second configuration (illustrated in FIG. 13) where the body 86 of flexible antenna 86 is adjacent to rear housing 28B within retainer 88. As illustrated in FIG. 12 flexible antenna 76 in the second position assumes an arcuate shape with the distal end 84 contacting the supporting surface on which local unit 28 is situated. Alternatively, flexible antenna 76 may be shorter in length, where, while still maintaining an arcuate configuration, distal end 84 does not contact the supporting surface upon which local unit 28 is situated.

Figure 8:
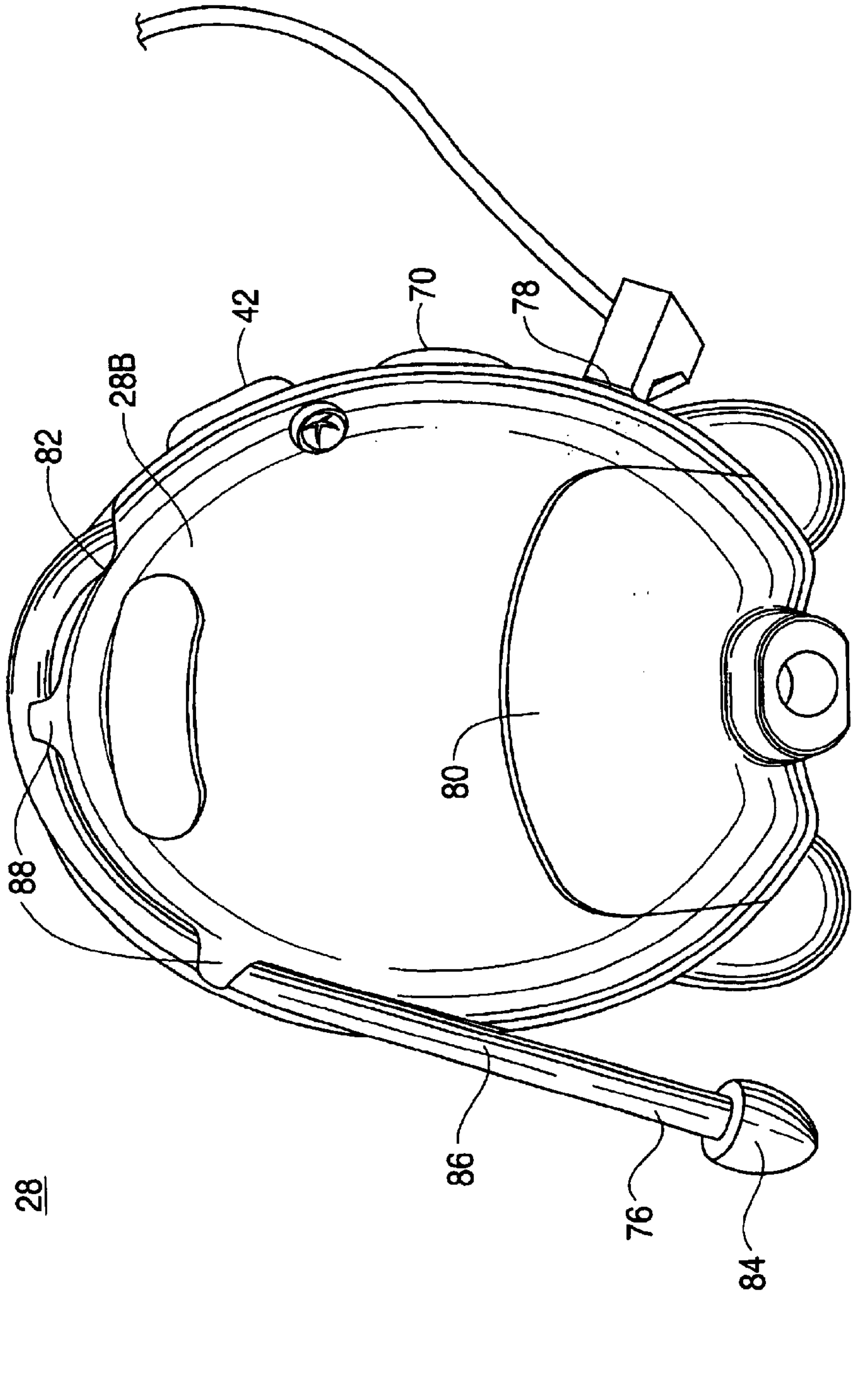
FIG. 8 is a rear view of the local unit of the child monitor system of FIG. 1.

Retainer 88, which maintains the position of flexible antenna 86 in its folded configuration, may be a detent in the body of rear housing 28B as illustrated in FIG. 8. Optionally, retainer 88 may be a clip (not shown) attached to the outside of rear housing 28B. Flexible antenna 76 of this example embodiment of the local unit 28 desirably provides for reducing the volume required for the physical space where the local unit 28 is positioned.

Power to the electronic components of local unit 28 is supplied by a main power supply which, in this example embodiment, consists of a 9V battery housed in battery compartment 80, which is incorporated in rear housing 28B.

Remote unit 18 includes a front housing 18A a rear housing 18B, an audio input transducer 20, an antenna 108, and an AC power adapter 68. Remote unit 18 also includes user controls and displays, including an ON/OFF switch 65, an A/B channel select switch 63, and a "POWER ON" LED 66.

Audio input transducer 20 of remote unit 18 is implemented as an omnidirectional condenser microphone mounted on the front face front housing 18A.

Power to the electronic components of remote unit 18 is provided by AC power adapter 68. Internal DC power (such as batteries) could also be used.

The transmitter and receiver circuitry used in the local and remote units may be any standard circuitry, as could be readily selected by the artisan. One suitable implementation is a 49 MHz system available from Excel Engineering, Ltd of Japan. Many other systems (including, for example, 900 MHz systems) are available from various suppliers.

Similarly, any suitable system may be used for the conversion circuitry in the local unit, by which the inputs from either the remote unit or the local microphone are converted to output signals for the audio output transducer. For the audio input at the local unit, which detects fetal sounds, the monitor uses RF high-pass and low-pass filters to focus on the fetal sounds. The filters filter out sounds below 30 Hz (which eliminates digestion sounds) and sounds above 1 KHz (eliminating ambient room noise). The fetal sounds are then amplified before being output. One suitable system is also available from Excel Corporation, which is incorporated into the receiver circuitry described above.

Child monitor system 10 is shown in FIG. 7 in the prenatal listening configuration. The user places audio input transducer 30 of local unit 28 on the abdomen of a pregnant woman and listens for fetal sounds via audio output transducer 38A using headphones.

Figure 13:
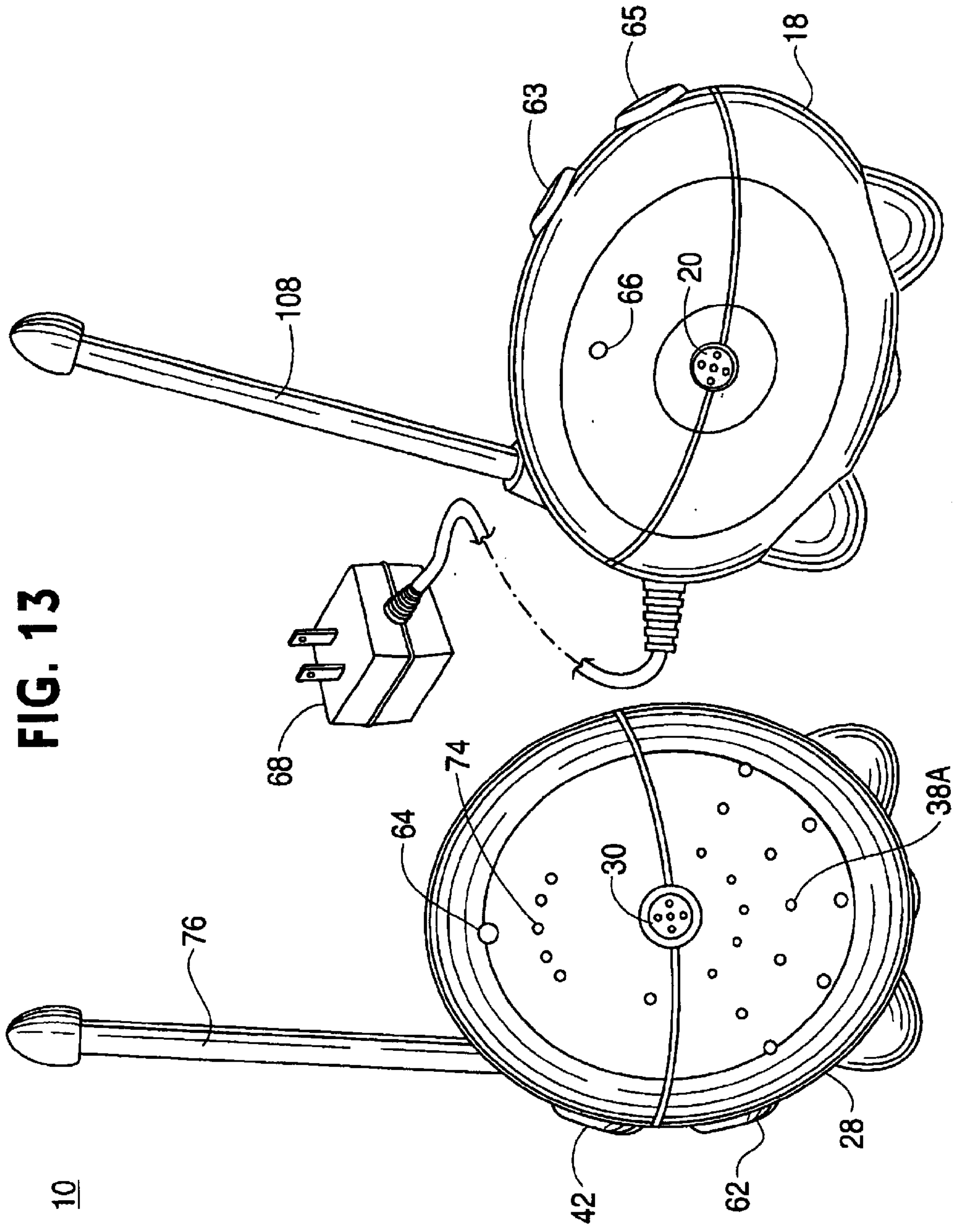
FIG. 13 is a prospective view of the nursery monitor mode of the child monitor system of FIG. 1.

Child monitor system 10 is shown in FIG. 13 in the nursery room monitor configuration. Remote unit 18 is placed in a room in proximity to a child the user wishes to monitor and local unit 28 is placed in a room where the user is located. In this mode, remote unit 18 receives, via audio input transducer 20, sounds made by the child and transmits these sounds to local unit 28. Local unit 28 outputs the sounds via audio output transducer (speaker) 38A. In this mode, sound level indicator 74 on local unit 28 selectively illuminates some or all of the five constituent LEDs to give a visible indication of the level of sound received at the remote unit 28. For example, a soft sound transmitted by the child unit will activate only the leftmost LED, however, more LEDs will be activated from left-to-right as a sound increases.

Figure 14:
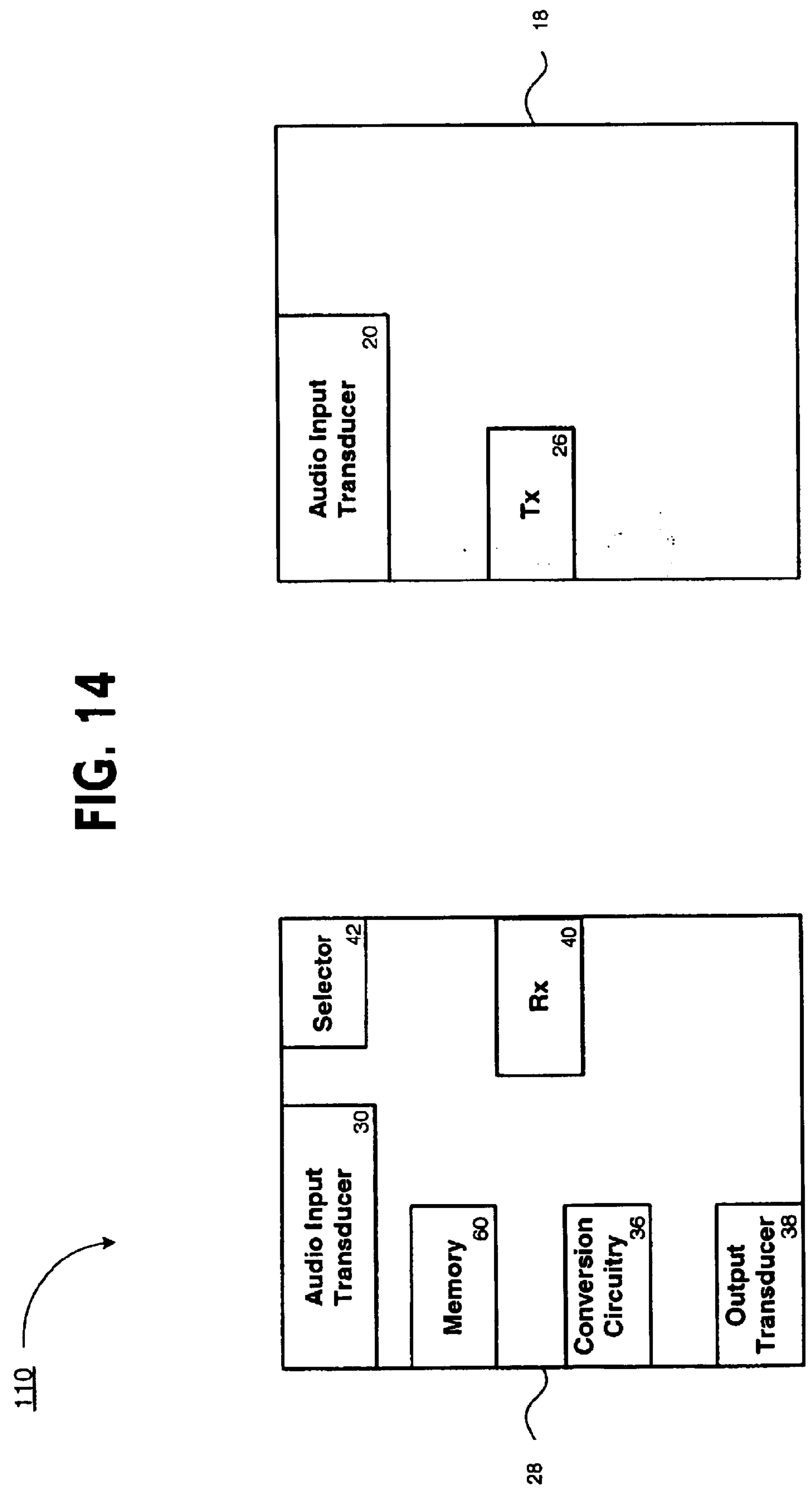
FIG. 14 is a schematic view of another embodiment of a child monitor system.

Another embodiment of a child monitor system is illustrated schematically in FIG. 14. Child monitor system 110 is similar to child monitor system 10 described above except that the local unit 28 includes a memory 60 in which input signals from either unit may be stored prior to being output to the conversion circuitry 36.

This embodiment may be implemented in the same manner as child monitor system 10. Memory 60 may be implemented in any of a number of ways that would be apparent to the artisan. One exemplary implementation could be a common digital recording integrated circuit such as a Winbond voice recorder with SRAM. In operation, the user pushes a record button to record and the system records sounds over sounds previously recorded and stored in the memory.

Figure 9:
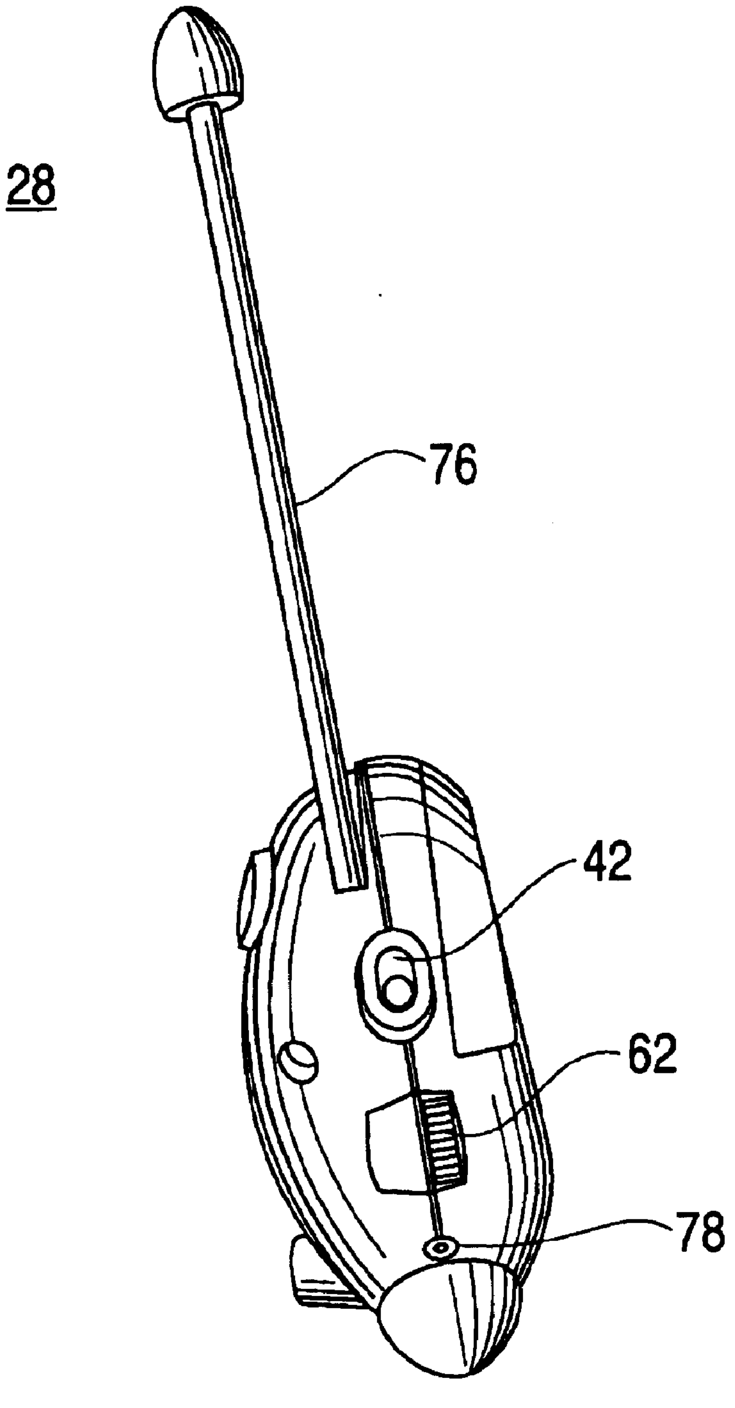
FIG. 9 is a side view of the local unit of the child monitor system of FIG. 1.
Figure 10:
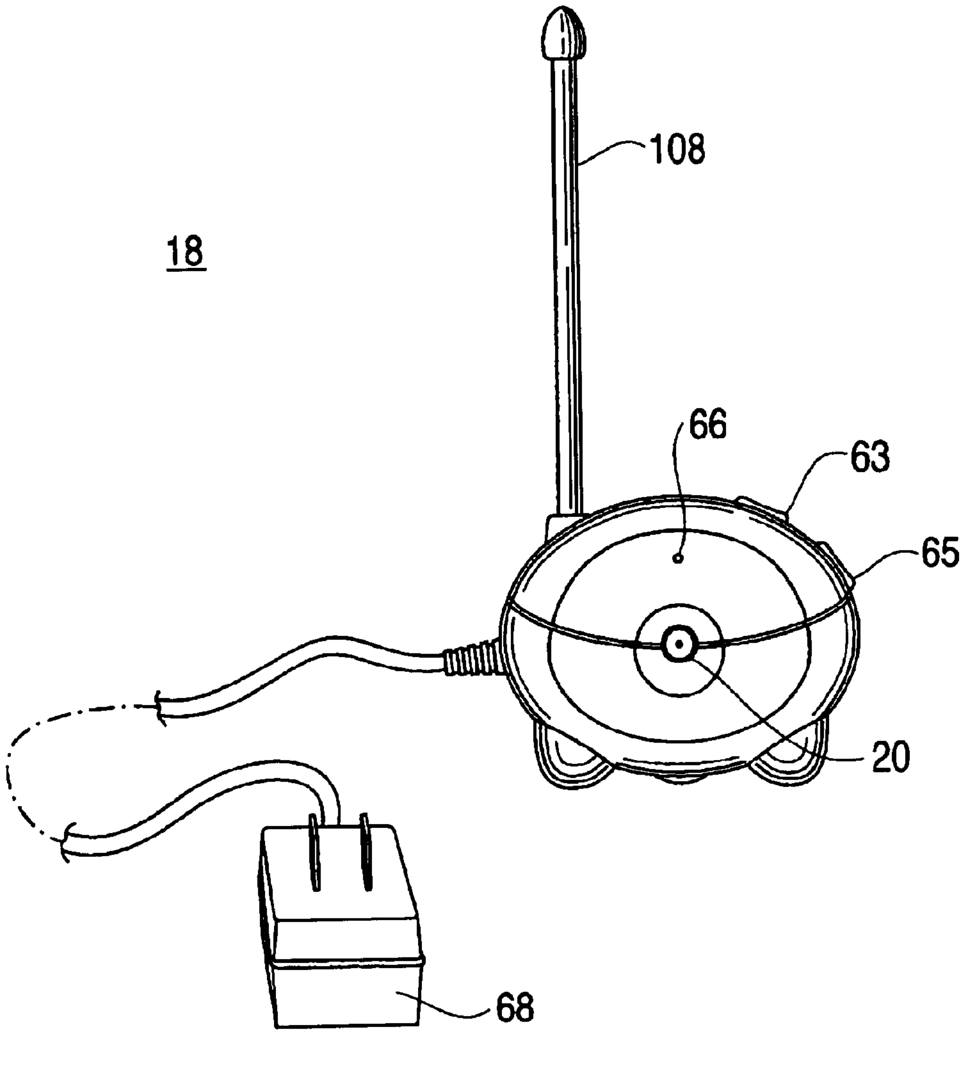
FIG. 10 is a frontal view of the remote unit of the child monitor system of FIG. 1.
Figure 11:
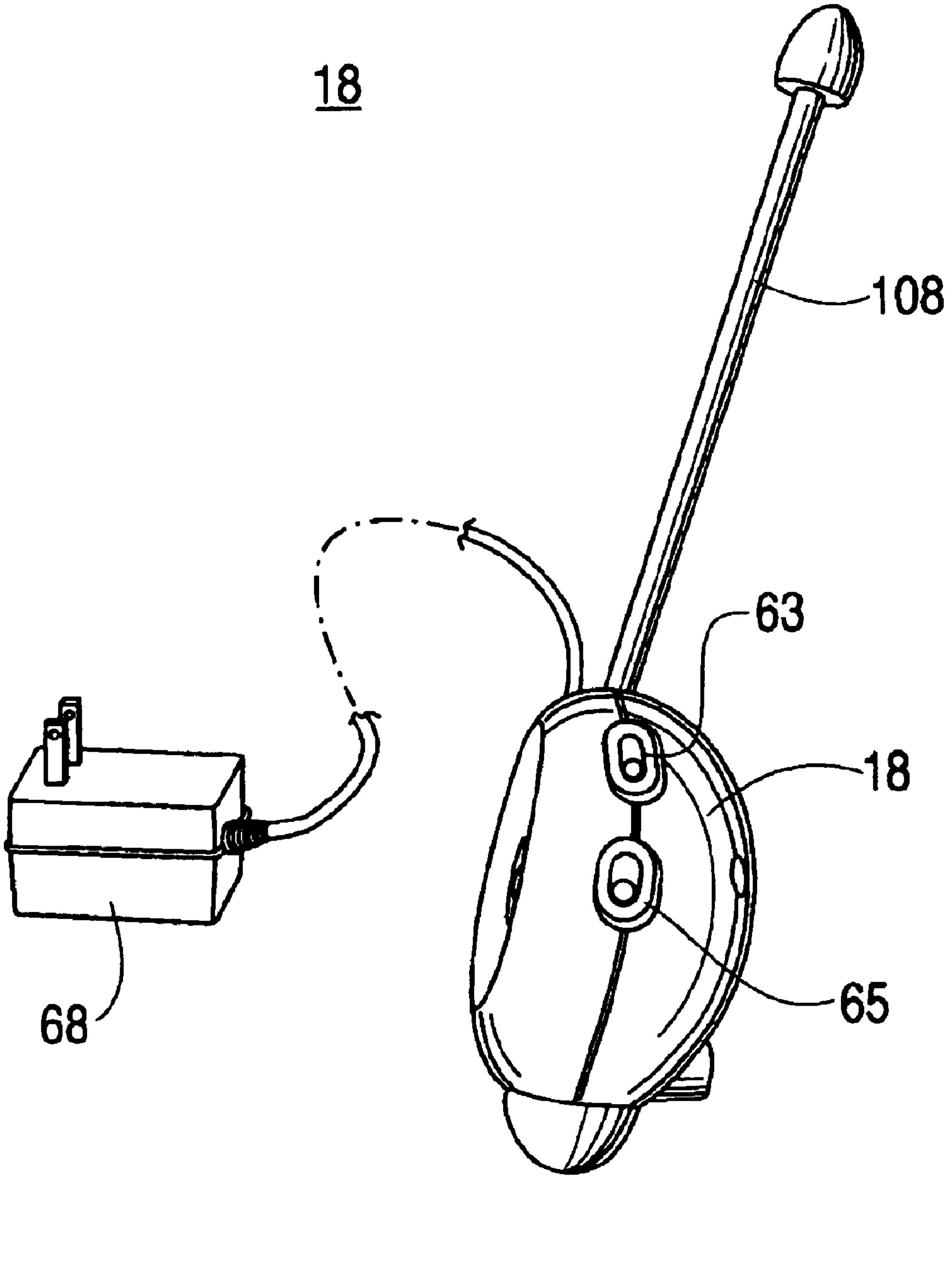
FIG. 11 is a side view of the remote unit of the child monitor system of FIG. 1.
Figure 15:
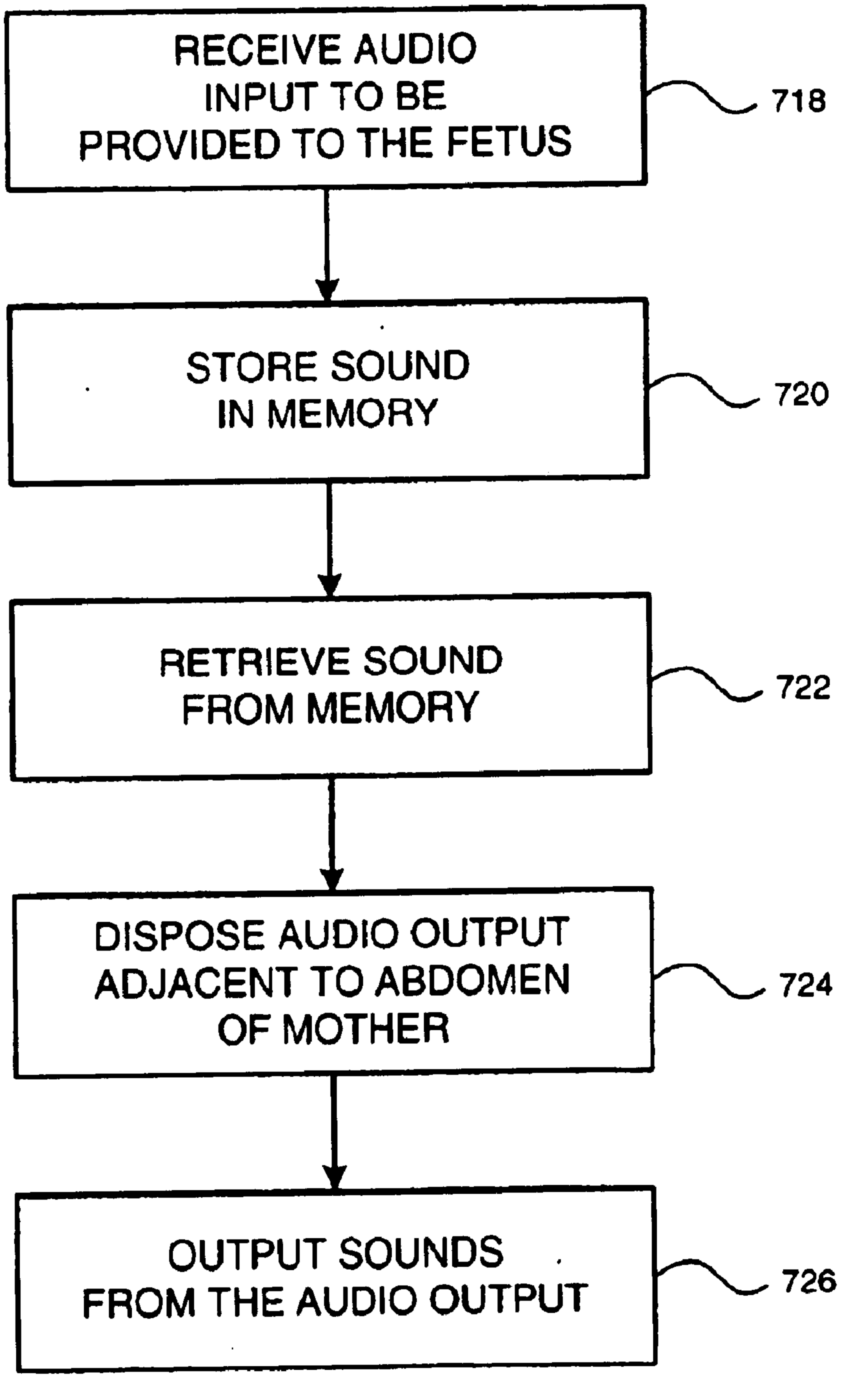
FIG. 15 is a flowchart illustrating a method for providing audio stimulation to an unborn child using the child monitor system of FIG. 14.

This configuration allows the user to record and later play back audio stimulation to a fetus, or save and later playback sounds made by an infant near the remote unit. FIGS. 7, 8, and 9 are flowcharts describing these operations. This configuration also allows the user to record fetal sounds for later playback. As shown in FIG. 15, to provide audio stimulation to a fetus, the system first receives the sound the user wishes to provide to the fetus at the audio input shown in operation 718. The system stores this sound in the memory and retrieves it when the user wishes to play it to the fetus. The flowchart depicts these steps in operations 720 and 722, respectively. To play the sound to the fetus, the user places the audio output adjacent to the mother's abdomen as the system outputs the sounds through the audio output shown in operations 724 and 726. In an alternative embodiment, audio stimulation to the fetus may be accomplished by using a external playback devices such as a CD or audio tape player connected to an audio input jack.

Figure 16:
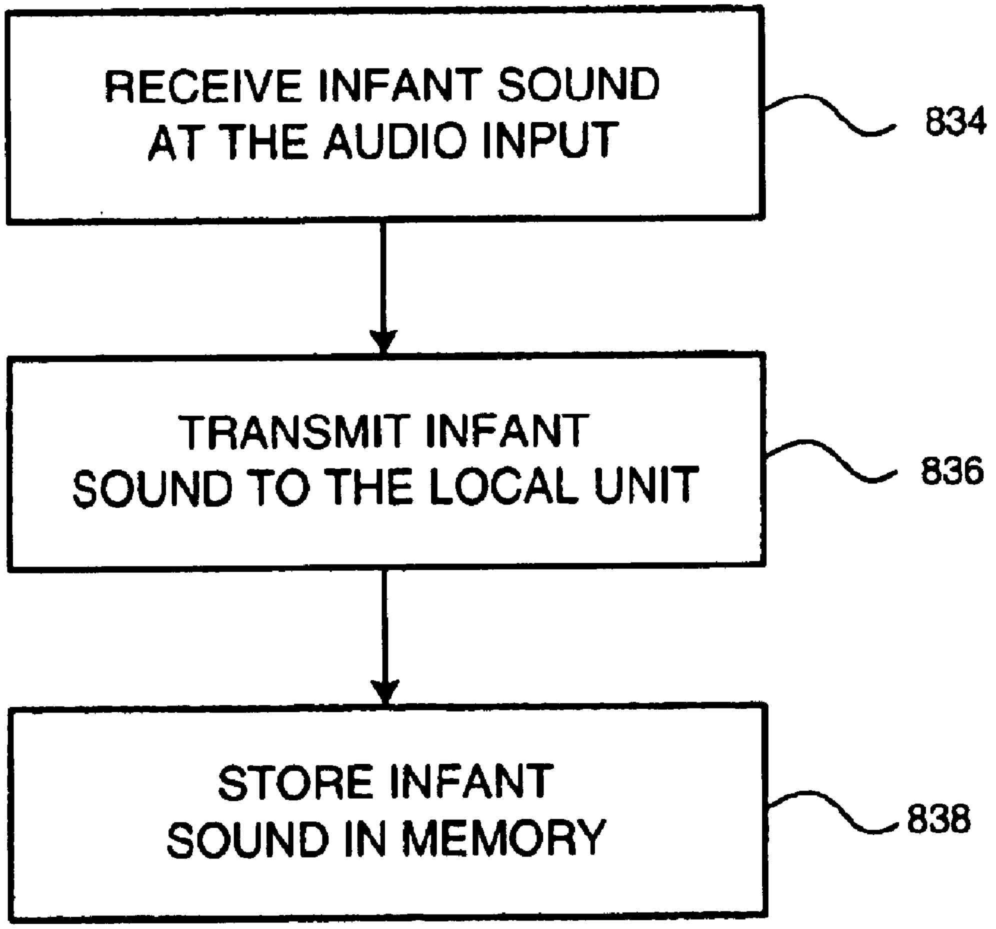
FIG. 16 is a flowchart illustrating a method for recording sounds made by an infant using the child monitor system of FIG. 14.
Figure 17:
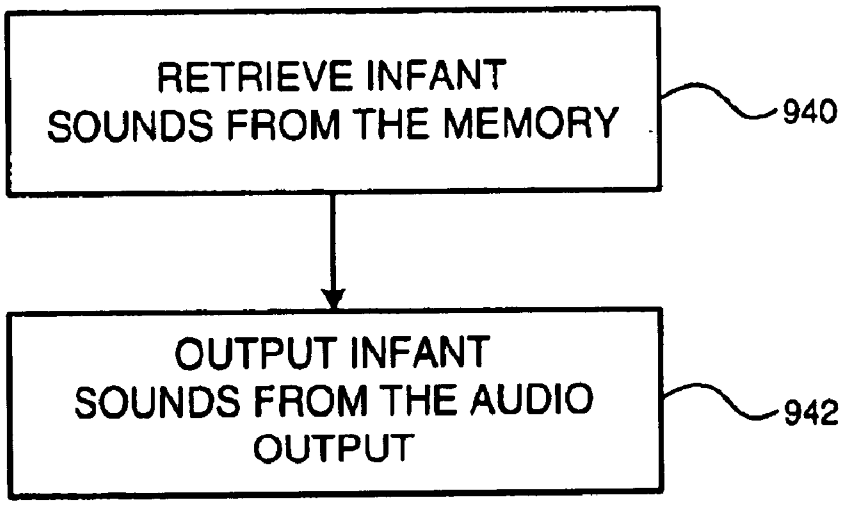
FIG. 17 is a flowchart illustrating a method for outputting recorded sounds made by an infant using the child monitor system of FIG. 14.
Figure 18:
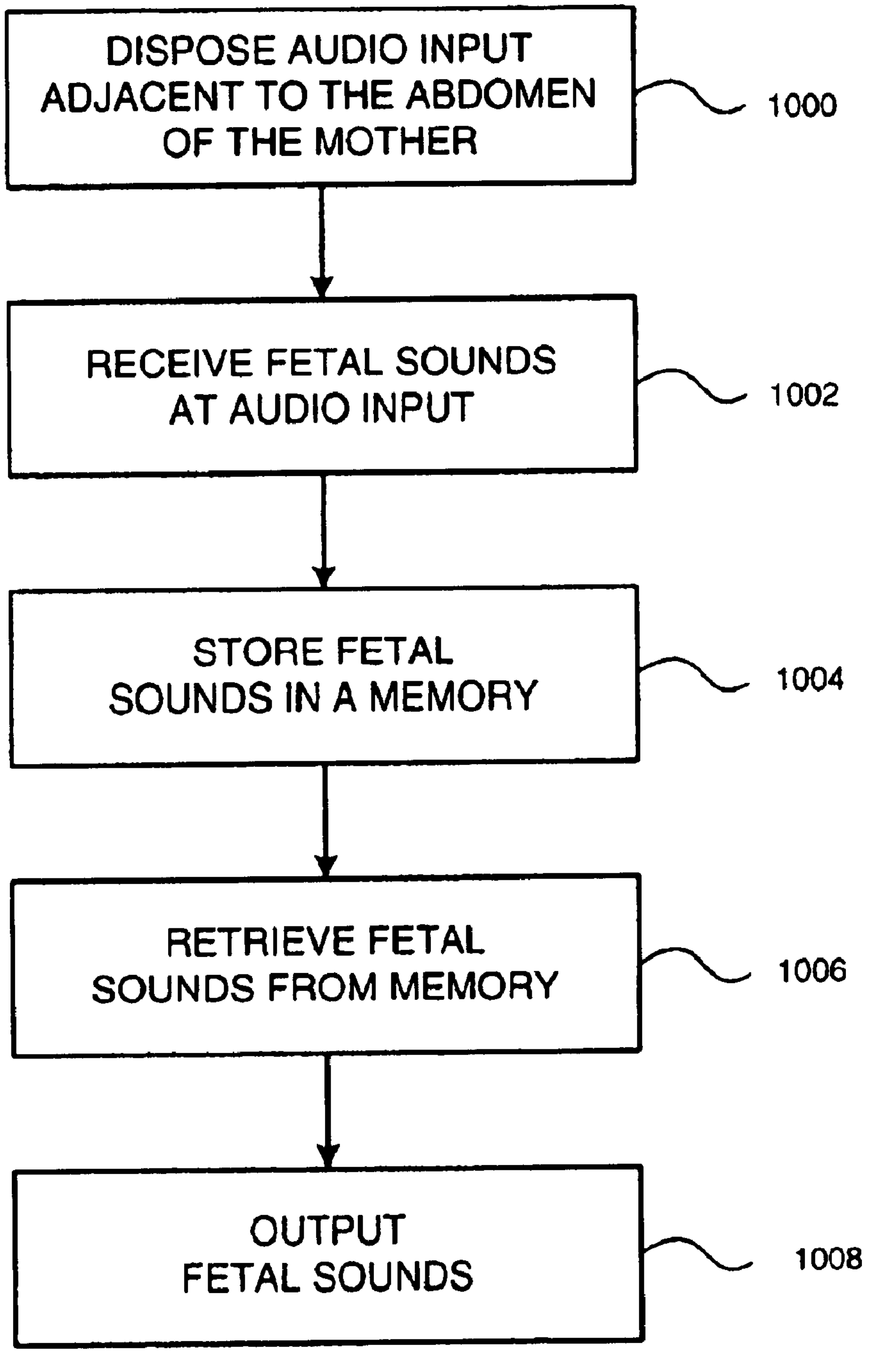
FIG. 18 is a flowchart illustrating a method for recording and playing back sounds made by an unborn child using the child monitor system of FIG. 14.

FIGS. 16 and 17 describe recording and outputting sounds made by an infant located near the remote unit 18. FIG. 16 describes the operation of the system to record sounds made by an infant. As shown in operations 834 and 836, the system receives, at the remote unit 18, sounds made by an infant and transmits these sounds to the local unit 28. The system then stores these sounds in the memory 60 shown in operation 838. Turning to FIG. 17, in order to output these recorded sounds, the system retrieves the infant sounds from the memory 60, shown in operation 940, and outputs the sounds at the audio output 38 of the local unit 28, shown in operation 942.

In addition to the operations described in FIGS. 15–17, FIG. 18 is a flowchart illustrating a method for recording sounds made by a child still in the mother's womb. The user places the audio input device 30 of the local unit 28 adjacent to the mother's womb, and the audio input device 30 receives sounds made by the fetus as shown in operations 1000 and 1002, respectively. In operation 1004, the memory 60 stores these sounds, and, when the user decides to playback the recorded sounds, the system 110, as shown in operation 1006, retrieves the sounds from the memory 60, and outputs the fetal sounds, shown in operation 1008.

Figure 19:
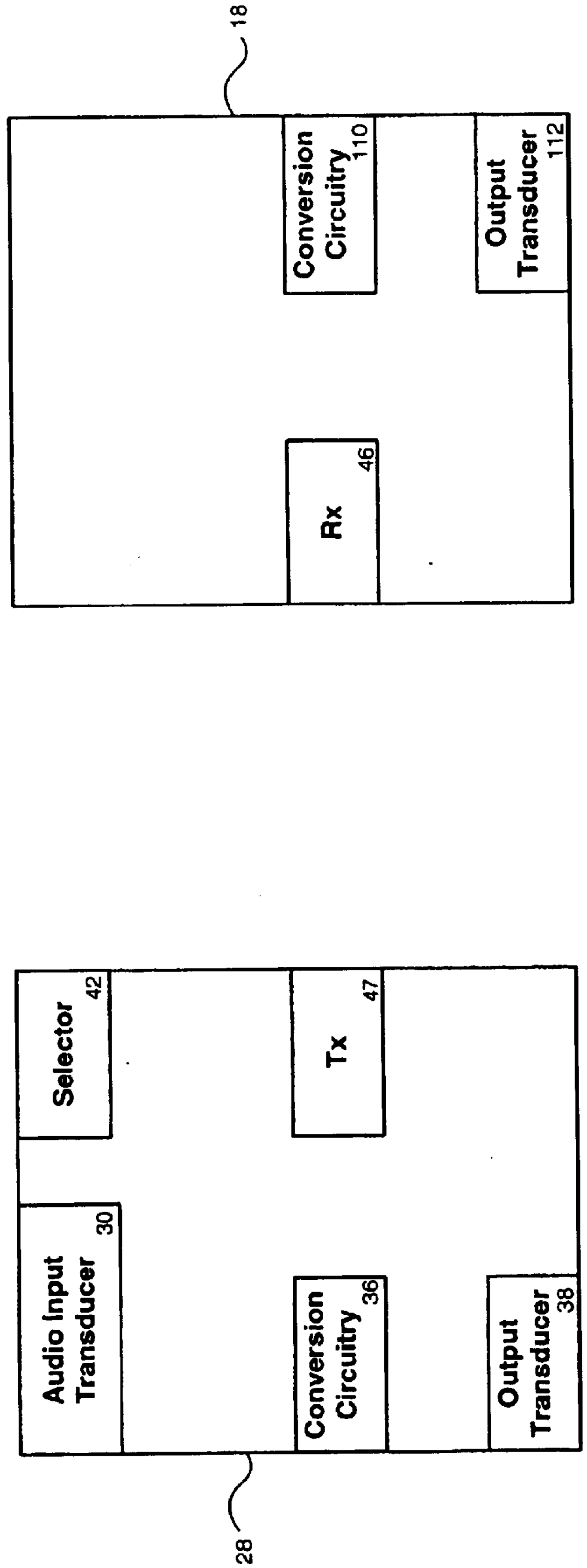
FIG. 19 is a schematic view of yet another embodiment of a child monitor system.

FIG. 19 schematically illustrates yet another embodiment of the child monitor system. In this embodiment, the system 210 may receive one audio input and deliver outputs to two locations. Thus, this configuration allows the user to select, via the selector 42, whether the system 210 will output the acoustic input from the local unit 28 or the remote unit 18. The local unit 28 includes an audio input transducer 30, first conversion circuitry 36, a first output transducer 38, a transmitter 47, and a selector 42. The remote unit includes a receiver 46, second conversion circuitry 110, and a second output transducer 112.

System 210 may be implemented in the same manner as that of system 10 described above and depicted in FIGS. 6–13. Second conversion circuitry 110 and second output transducer 112 may be the same as or similar to that of conversion circuitry 36 and output transducer 38 of local unit 28. The artisan could select several implementations of second conversion circuitry 110 and output transducer 112. One exemplary implementation for the output transducer could be a speaker located within remote unit 18 or headphones, for example.

Figure 20:
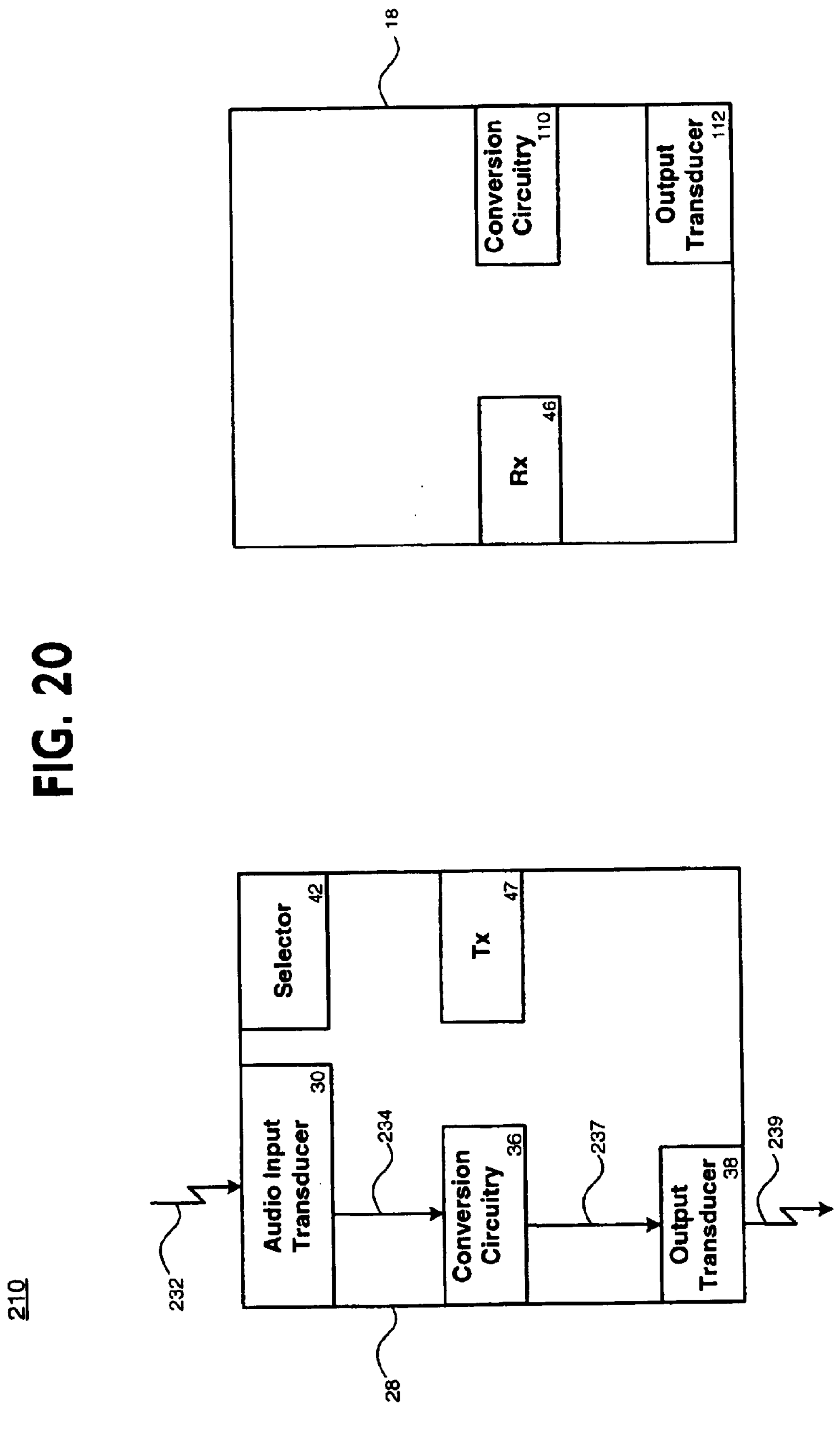
FIG. 20 illustrates a first operating mode of the child monitor system of FIG. 19.

The user may select multiple operating modes from this configuration, and FIG. 20 depicts a first operating mode. Here, the user has selected that the system 210 output an audio signal from the local unit 28. The audio input transducer 30 of the local unit 28 receives an audio input signal 232 and converts it into an input signal 234. The conversion circuitry 36 converts this signal to an output signal 237, which the audio output transducer 38 then converts into an acoustic output 239.

Figure 21:
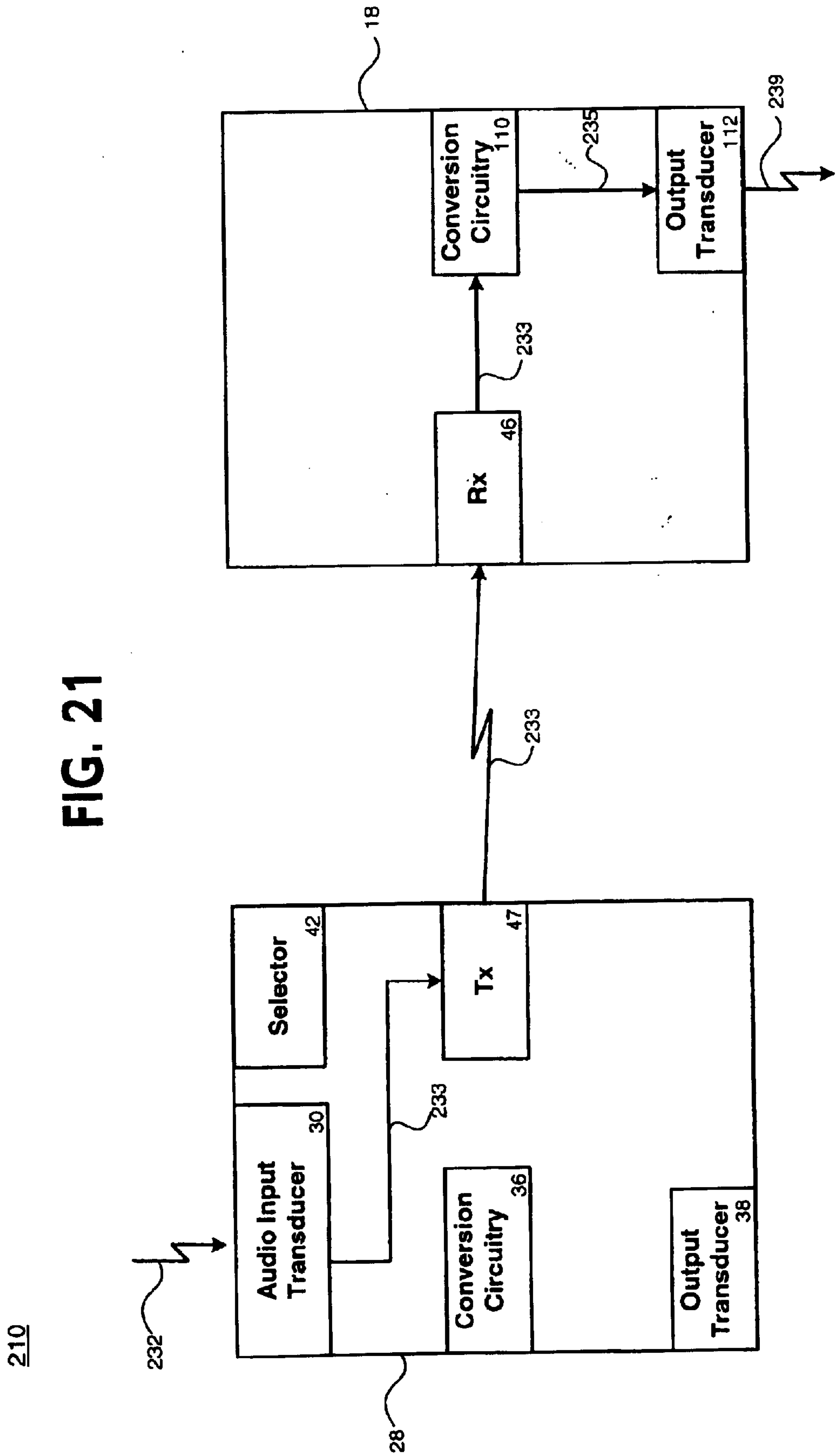
FIG. 21 illustrates a second operating mode of the child monitor system illustrated in FIG. 19.

FIG. 21 illustrates a second operating mode using the same configuration. In this mode, the user has selected that the remote unit 18 deliver the acoustic output. The audio input transducer 30 of the local unit 28 receives an acoustic input 232 and converts it into an input signal 233. The transmitter 47 transmits this signal to the receiver 46. Conversion circuitry 110 of the remote unit 18 then converts the signal into an output signal 235, and the output transducer 112 outputs an acoustic output 239.

Figure 22:
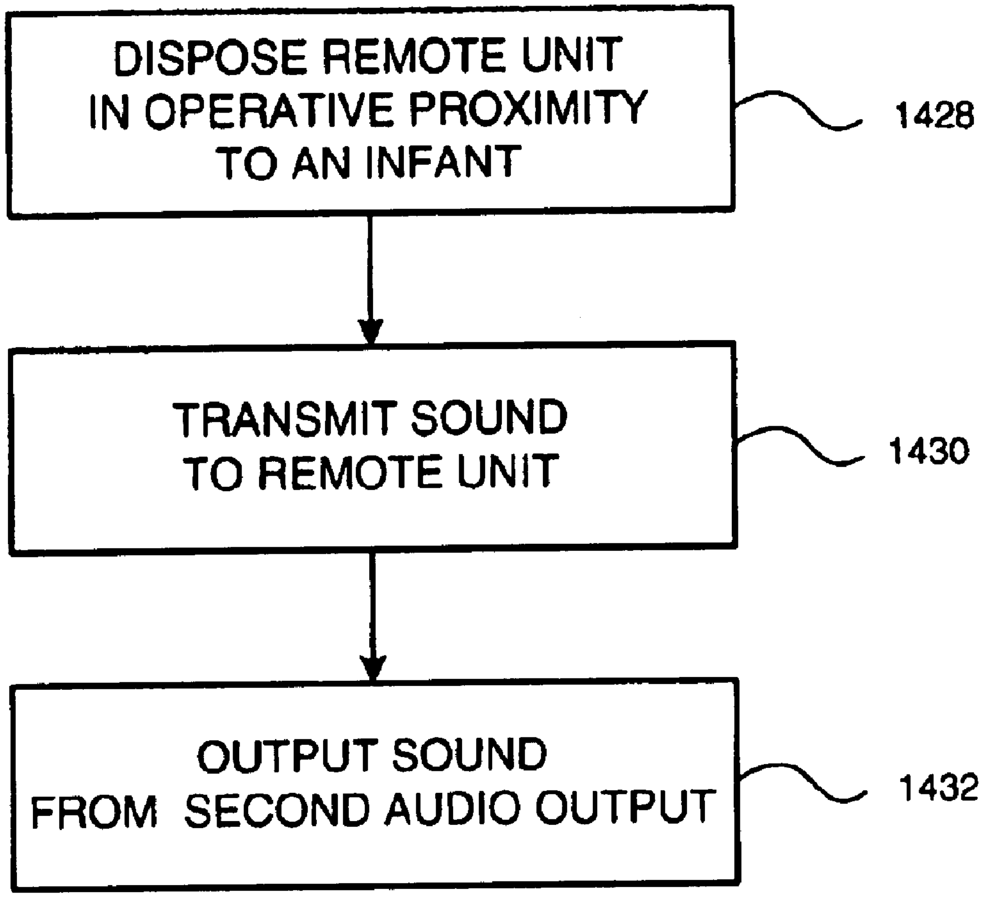
FIG. 22 is a flowchart illustrating a method for providing sounds to an infant near the remote unit of the child monitor system of FIG. 19.

With this configuration, the user, at the local unit 28, may provide sounds to a child located near the remote unit 18. FIG. 22 is a flowchart which describes this operation. First, in operation 1428 the user places the remote unit in operative proximity to an infant. The local unit then transmits the sound to the remote unit 18 shown in operation 1430, and the remote unit 18 outputs the sounds from a audio output 205 shown in operation 1432.

Figure 23:
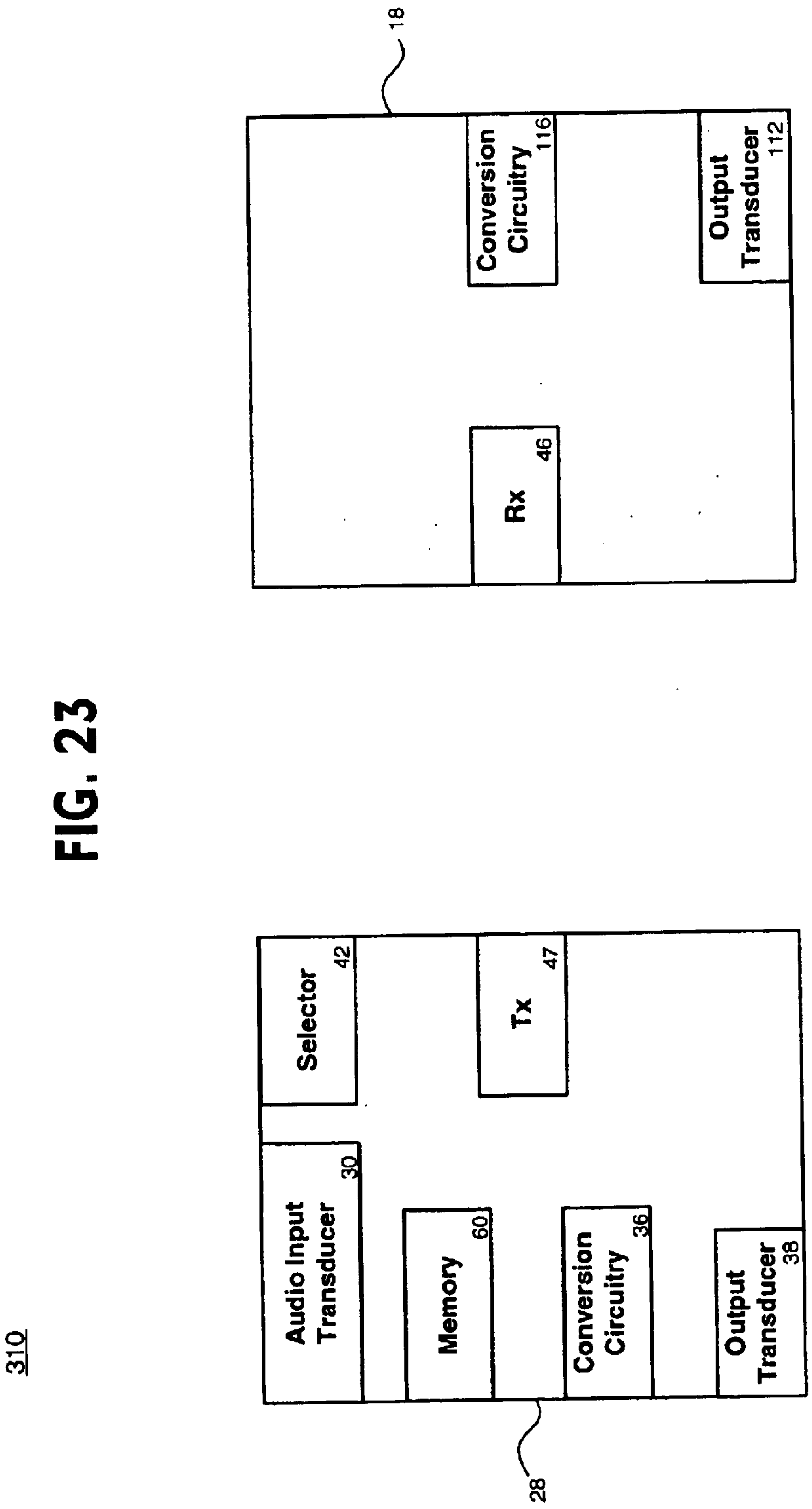
FIG. 23 is a schematic view of yet another embodiment of a child monitor system.

FIG. 23 shows a further modification of the configuration of the child monitor system 310. In this modification, local unit 28 includes a memory 60 in which the input signal may be stored prior to being output to the conversion circuitry 36 or transmitted to the remote unit 18. System 310 may also be implemented in the same manner as described above for system 10 and shown in FIGS. 6–13 and memory 60 in the same manner as described above for system 110.

Figure 24:
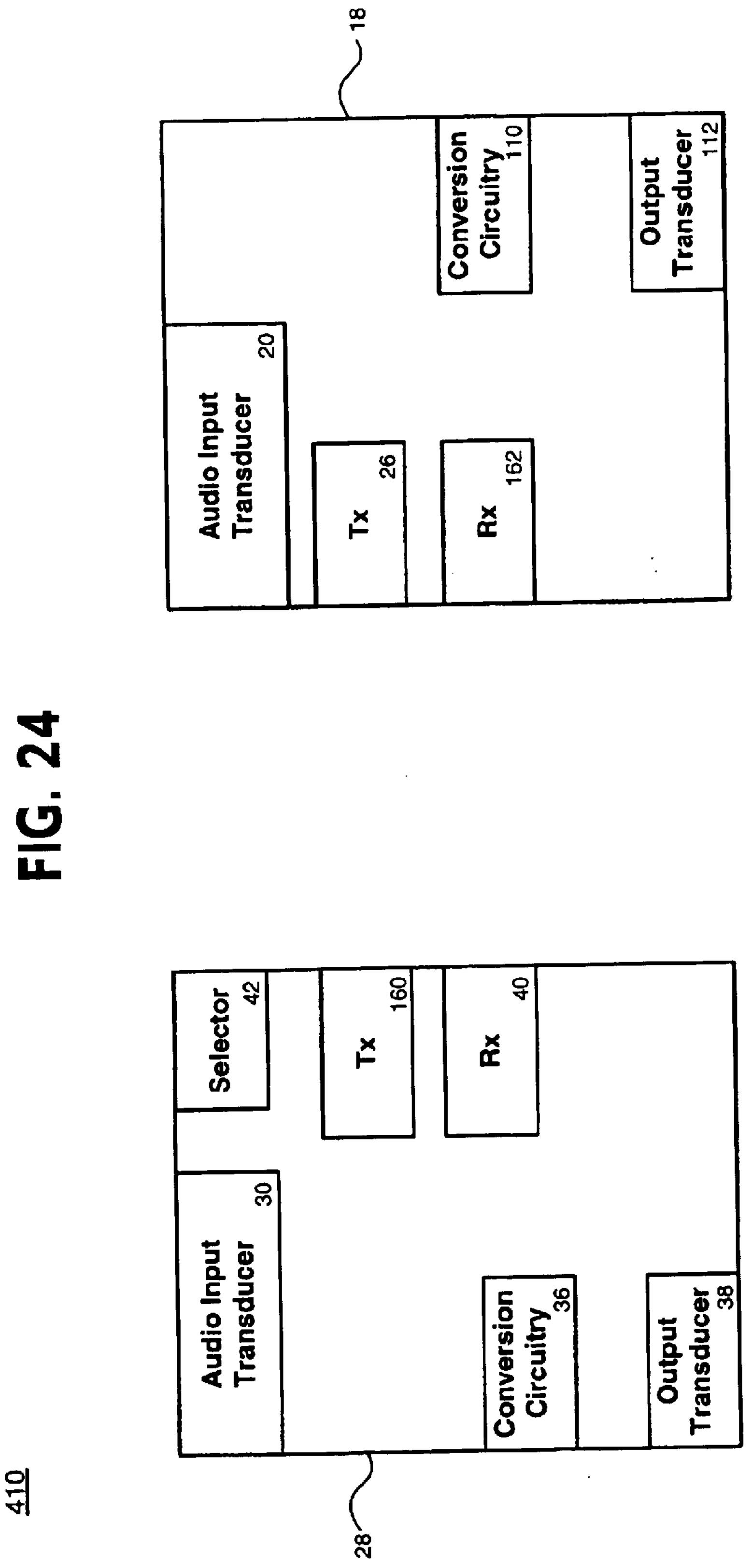
FIG. 24 is a schematic view of still another embodiment of a child monitor system.

Another embodiment of the present invention is illustrated in FIG. 24. In this embodiment, the local and remote units both have audio input transducers 30 and 20, output transducers 38 and 112, transmitters 160 and 26, receivers 40 and 162, and conversion circuitry 36 and 110. This configuration, which may also be implemented in the same manner as described above for system 10 and shown in FIGS. 6–13, allows the user to select multiple input-output combinations, the operation of which will be described below.

Transmitter 160 and receiver 162 may be implemented in the same manner as transmitter 26 and receiver 40. In one embodiment, the two way communication is implemented using half duplex two-way communication that uses automatic switching on a 30 ms duty cycle. This system is biased toward receiving rather than transmitting. An artisan, however, will realize that full-duplex two-way communication could also be used to allow signals to be transmitted and received simultaneously.

Figure 25:
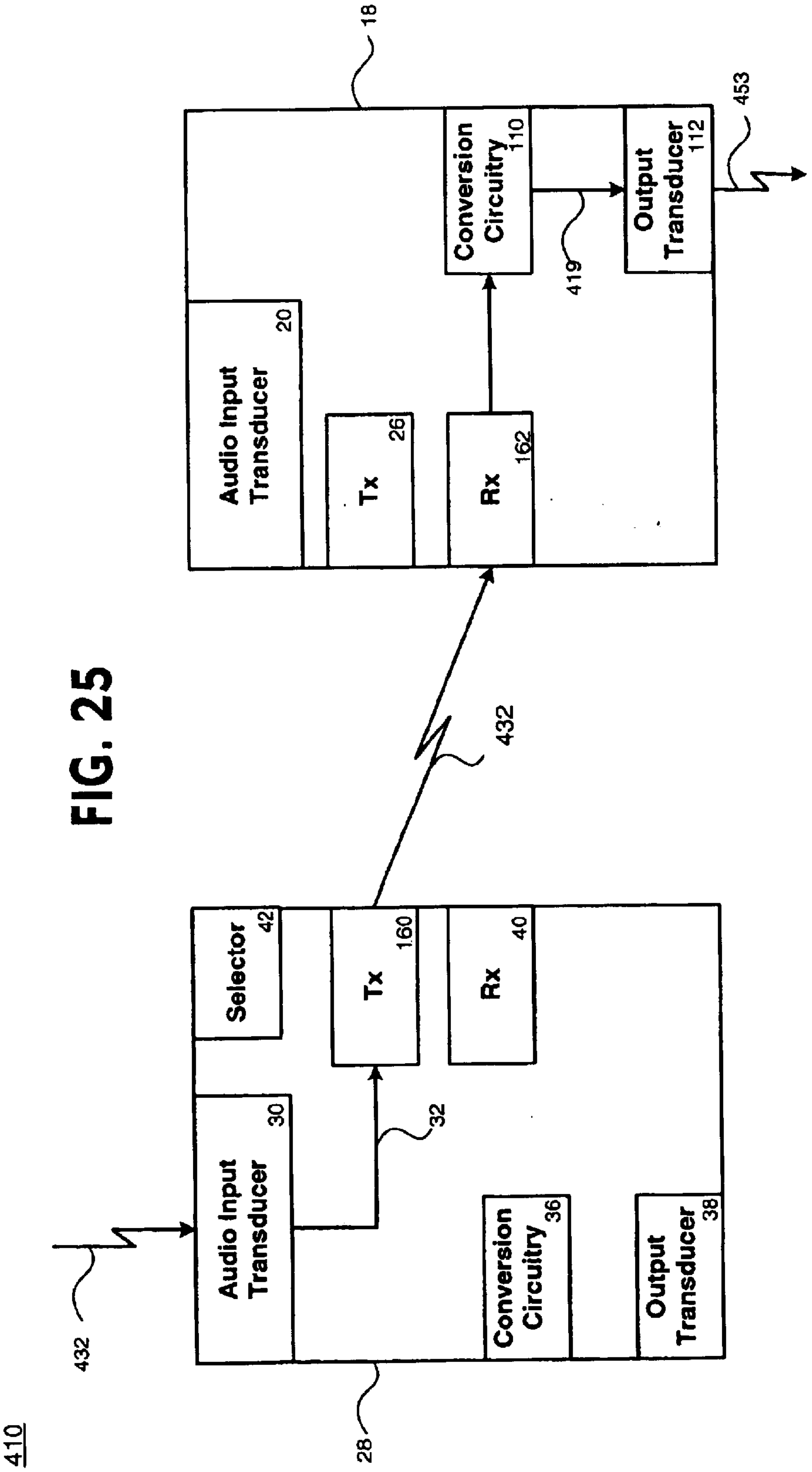
FIG. 25 illustrates a first operating mode of the child monitor system of FIG. 24.

FIG. 25 illustrates an operating mode of the present invention using the configuration described above in which the system transmits the audio input 432 received by the audio input transducer 30 of the local unit 28 to the remote unit 18 for output. The transmitter 160 of the local unit 28 transmits the audio input signal 432 to the receiver 162 of the remote unit. The conversion circuitry 110 of the remote unit 18 converts the audio input signal into an output signal 419, which the output transducer 112 converts into an audio output signal 453.

Figure 26:
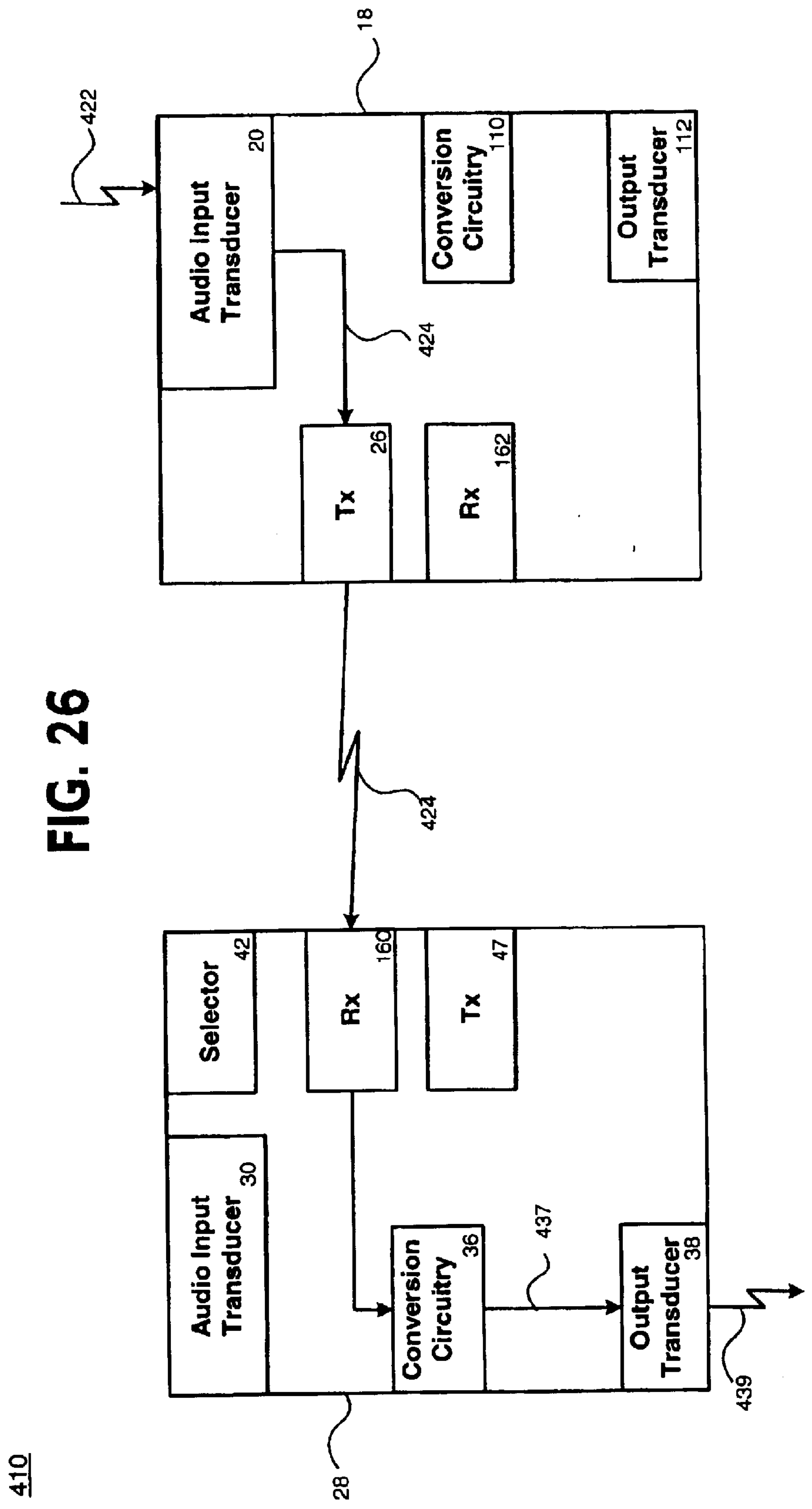
FIG. 26 illustrates a second operating mode of the child monitor system of FIG. 24.

FIG. 26 depicts the operation just described, but in reverse. Here, the audio input 422 received by the audio input transducer 20 of the remote unit 18 converts the audio input into an input signal 424. The transmitter 26 of the remote unit 18 transmits this signal to the receiver 40 of the local unit 28. The conversion circuitry 36 of the local unit 28 converts this signal into an output signal 437, which the output transducer 38 of the local unit 28 converts into an audio output 439.

FIGS. 19 and 20 illustrate operating modes of the child monitor system 410 of FIG. 26 in which no transmission is involved. In figure FIG. 27 the audio input transducer 30 of the local unit 28 receives an audio input signal 432 and converts it to an input signal 434. The conversion circuitry 36 of the local unit 28 converts the signal into an output signal 437. The output transducer 38 of the local unit 28 then converts the signal into an audio output 439.

Figure 28:
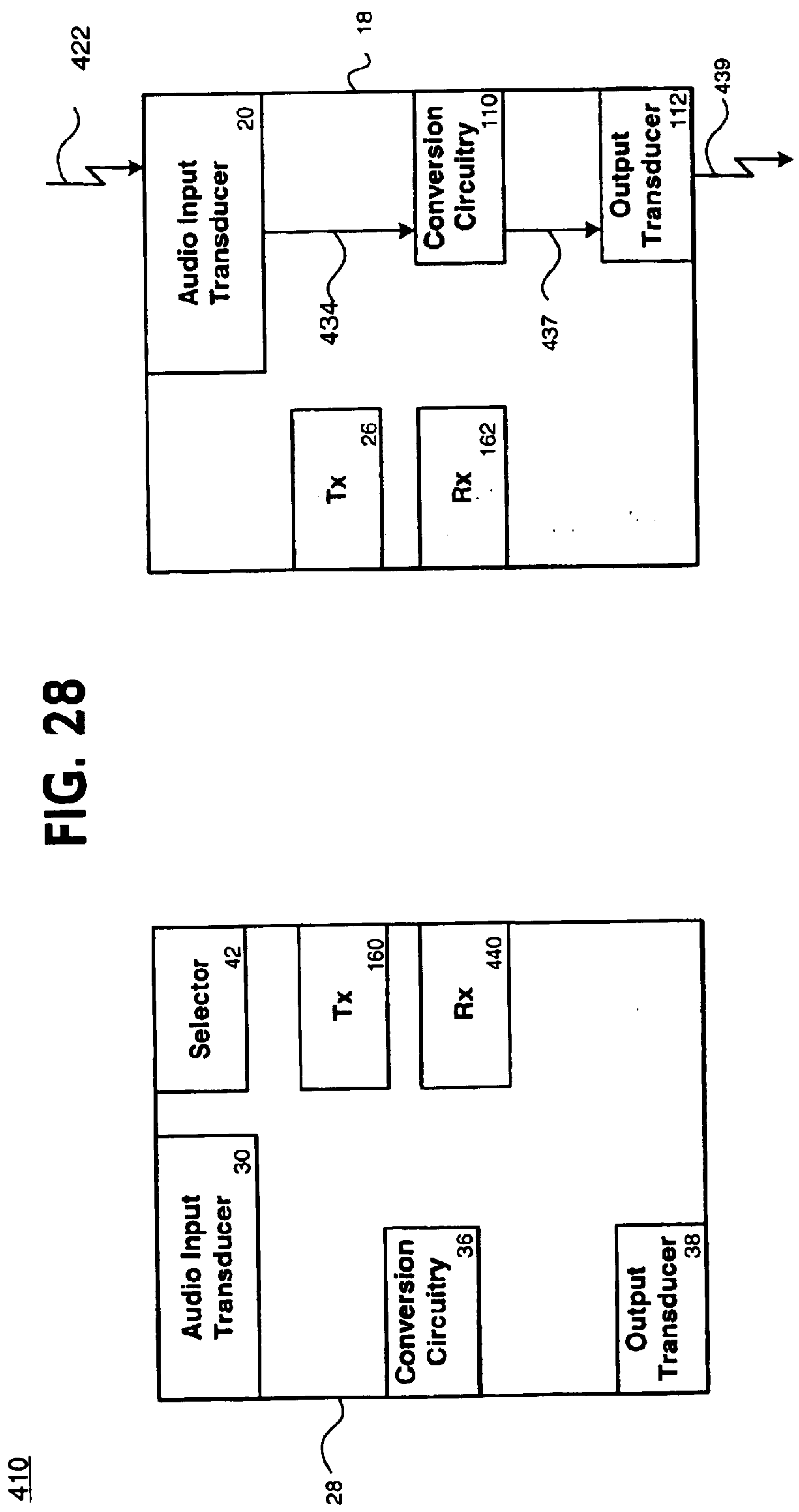
FIG. 28 illustrates a forth operating mode of the child monitor system of FIG. 24.

FIG. 28 illustrates the same operation, but at the remote unit. Here, the audio input transducer 20 of the remote unit 18 receives an audio input signal 422 and converts it to an input signal 434. The conversion circuitry 110 of the remote unit 18 converts the signal into an output signal 437. The output transducer 349 of the remote unit 18 then converts the signal into an audio output 439.

While example embodiments have been illustrated and described above, those of skill in the art will understand that various changes in detail and in the general construction and arrangement of the invention may be made without departing from the spirit and scope of the invention as described in the following claims.

What is claimed is:

1. A monitor system, comprising:

a remote unit having a first audio input transducer for converting a first acoustic input into a first input signal;

a transmitter for transmitting said first input signal; and a local unit having a second audio input transducer for converting a second acoustic input into a second input signal, conversion circuitry for converting said first input signal into a first output signal, an output transducer for converting output signals to acoustic output, a receiver for receiving said first input signal from said transmitter, and a selector by which a user can selectively change operation of said local unit between a first operating mode and a second operating mode, wherein in said first operating mode, said first input signal is provided to said conversion circuitry for conversion to said first output signal, said first output signal is provided to said output transducer, and in said second operating mode, said second input signal is provided to said conversion circuitry for conversion to a second output signal, said second output signal is provided to said output transducer.

2. The monitor system of claim 1, wherein said local unit further includes a memory in which said second input signal can be stored for subsequent output to said conversion circuitry.

3. The monitor system of claim 1, wherein said transmitter is a first transmitter, said local unit further includes a second transmitter configured to transmit said second input signal;

said receiver is a first receiver, said remote unit further includes a second receiver configured to receive said second input signal, said conversion circuitry is first conversion circuitry, said remote unit further includes second conversion circuitry, said output transducer is a first output transducer, said remote unit further includes a second output transducer; and said selector further configured to enable a selection of a third operating mode, in which said second input signal is provided to said second conversion circuitry for conversion to said second output signal, said second output signal being provided to said second output transducer.

4. A monitor system, comprising:

a local unit having an audio input transducer for converting an acoustic input to an input signal, first conversion circuitry for converting said input signal into a first output signal, a first output transducer for converting said first output signal to a first acoustic output, a transmitter for transmitting said input signal;

a remote unit having a receiver for receiving said input signal, second conversion circuitry for converting said input signal into a second output signal, and a second output transducer for converting said second output signal into a second acoustic output; and a selector coupled to said local unit by which a user can selectively change between a first operating mode and a second operating mode, wherein:

in said first operating mode said input signal is provided to said first conversion circuitry for conversion to said first output signal, said first output signal is provided to said first output transducer, and in said second operating mode said input signal is provided to said second conversion circuitry for conversion to said second output signal, which second output signal is provided to said second output transducer.

5. The monitor system of claim 4 wherein said local unit further includes a memory in which said input signals can be stored for subsequent output.

6. The monitor system of claim 4, wherein said input transducer is a first input transducer, said acoustic input is a first acoustic input, said input signal is a first input signal, said remote unit further includes a second input transducer configured to convert a second acoustic input to a second input signal, and said transmitter is a first transmitter, said remote unit further includes a second transmitter configured to transmit said second input signal;

said receiver is a first receiver, said local unit further includes a second receiver configured to receive said second input signal; and said selector further enables selection of a third operating mode in which said second input signal is provided to said second transmitter for transmission to said second receiver and then to said first conversion circuitry for conversion to a third output signal, said third output signal is provided to said first output transducer.

7. A monitor system, comprising:

a remote unit including a first input configured to receive a first input signal, a first transmitter configured to transmit said first input signal, a first conversion circuitry, a first receiver, and a first output device; and a local unit including a second receiver configured to receive said first input signal, a second input configured to receive a second input signal, a second transmitter configured to transmit said second input signal, a second conversion circuitry configured to convert said first input signal to a first output signal and said second input signal to a second output signal, and a second output device configured to output said first output signal and said second output signal, said second conversion circuitry configured to receive the second input signal through said second receiver, and said second output device configured to output a third output signal associated with the second input signal, said monitor system being operable in a first mode, a second mode and a third mode, the first output signal being output by said second output device when said monitor system is in the first mode, the second output signal being output by said second output device when said monitor system is in the second mode, and the third output signal being output by said second output device when said monitor system is in the third mode.

8. The monitor system of claim 7, wherein said local unit further includes a memory configured to store at least one of said first input signal and said second input signal.

9. A method, comprising:

receiving via a first input transducer of a remote unit a first input;

transmitting the first input;

receiving via a receiver of a local unit the first input;

receiving via a second input transducer of the local unit a second input;

selectively outputting from an output transmitter of the local unit at least one of a first output associated with the first input and a second output associated with the second input;

storing at least one of the first input and the second input in a memory of the local unit; and selectively recalling the stored at least one of the first input and the second input.

10. The method of claim 9, further comprising outputting the second input from the remote unit.

* * * * *